US009729302B2

(12) United States Patent
Shinojima et al.

(10) Patent No.: US 9,729,302 B2
(45) Date of Patent: Aug. 8, 2017

(54) APPARATUS AND METHOD FOR CONTROLLING RESOURCES IN A CORE NETWORK

(71) Applicant: FUJITSU LIMITED, Kawasaki-shi, Kanagawa (JP)

(72) Inventors: Ryota Shinojima, Kawasaki (JP); Hiroyuki Fujii, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 442 days.

(21) Appl. No.: 14/085,562

(22) Filed: Nov. 20, 2013

(65) Prior Publication Data

US 2014/0198740 A1    Jul. 17, 2014

(30) Foreign Application Priority Data

Jan. 11, 2013  (JP) ................. 2013-004043

(51) Int. Cl.
    *H04L 5/00*    (2006.01)
(52) U.S. Cl.
    CPC ............ *H04L 5/0078* (2013.01); *H04L 5/003* (2013.01); *H04L 5/0058* (2013.01); *H04L 5/0085* (2013.01)
(58) Field of Classification Search
    CPC ..... H04L 5/003; H04L 5/0078; H04L 5/0058; H04L 5/00; H04L 5/0053; H04L 5/0064; H04L 5/0085; H04L 5/0073; H04L 5/0096; H04W 24/02; H04W 24/10; H04W 88/08; H04W 72/04
    USPC ................................. 370/329, 311
    See application file for complete search history.

(56) References Cited

U.S. PATENT DOCUMENTS

| 2005/0113106 A1* | 5/2005 | Duan ................... H04L 1/0002 455/452.2 |
| 2006/0063544 A1 | 3/2006 | Zhao et al. |
| 2007/0178840 A1* | 8/2007 | Deguchi ............... H04W 88/10 455/62 |

(Continued)

FOREIGN PATENT DOCUMENTS

| JP | 2006-505200 A | 2/2006 |
| JP | 2009-152854 A | 7/2009 |

(Continued)

OTHER PUBLICATIONS

Japanese Office Action of related Japanese Patent Application No. 2013-004043 dated Jul. 12, 2016 (with partial English translation).

*Primary Examiner* — Michael Thier
*Assistant Examiner* — Rownak Islam
(74) *Attorney, Agent, or Firm* — Arent Fox LLP

(57)  ABSTRACT

A base station apparatus determines, in accordance with at least one of a communication frequency of a mobile station apparatus, a congestion state of a core network that connects a radio access network and a public network, a number of users being located in a cell of the base station apparatus, and a radio state, a hold period for which a core network resource is to be held, where the core network resource is used for setting a bearer in the core network for the mobile station apparatus. The base station apparatus transmits information indicating the determined hold period to a gateway apparatus in the core network, thereby causing the gateway apparatus to release the core network resource after a period corresponding to the hold period has elapsed.

17 Claims, 22 Drawing Sheets

(56) References Cited

U.S. PATENT DOCUMENTS

| | | | |
|---|---|---|---|
| 2008/0096614 A1* | 4/2008 | Venkatachalam | H04W 76/046 455/574 |
| 2009/0122763 A1* | 5/2009 | Oguchi | H04W 36/34 370/331 |
| 2010/0165905 A1* | 7/2010 | Kanazawa | H04W 72/005 370/312 |
| 2010/0216436 A1* | 8/2010 | Wijayanathan | H04W 76/068 455/414.1 |
| 2010/0325289 A1* | 12/2010 | Dostal | H04L 12/1818 709/227 |
| 2012/0033638 A1* | 2/2012 | Nishida | H04W 76/068 370/331 |
| 2013/0201904 A1* | 8/2013 | Toskala | H04W 36/165 370/315 |
| 2014/0162706 A1* | 6/2014 | Daly | H04W 4/12 455/466 |
| 2014/0177592 A1* | 6/2014 | Li | H04W 36/0022 370/331 |
| 2015/0017923 A1* | 1/2015 | Mutya | H04W 24/10 455/67.11 |
| 2015/0181640 A1* | 6/2015 | Kwong | H04W 28/18 370/329 |

FOREIGN PATENT DOCUMENTS

| | | |
|---|---|---|
| JP | 2010-183542 A | 8/2010 |
| JP | 2012-23706 A | 2/2012 |
| WO | WO 2012/136311 A1 | 10/2012 |

\* cited by examiner

FIG. 7

| COMMUNICATION START TIME | COMMUNICATION END TIME | COMMUNICATION INTERVAL [MINUTES] |
|---|---|---|
| 8:00 | 8:10 | — |
| 9:00 | 9:10 | 50 |
| 10:30 | 10:50 | 80 |

FIG. 9

| PRIORITY | RESOURCE ID | HOLD PERIOD [%] | MAXIMUM HOLD PERIOD [SECONDS] |
|---|---|---|---|
| 1 | X | 10 | 10 |
| 2 | Y | 20 | 20 |
| 3 | Z | 80 | 30 |

APPARATUS AND METHOD FOR CONTROLLING RESOURCES IN A CORE NETWORK

CROSS-REFERENCE TO RELATED APPLICATION

This application is based upon and claims the benefit of priority of the prior Japanese Patent Application No. 2013-004043 filed on Jan. 11, 2013, the entire contents of which are incorporated herein by reference.

FIELD

The embodiment discussed herein is related to apparatus and method for controlling resources in a core network.

BACKGROUND

A control method may be used to prevent a release of a bearer in a core network that is set for a mobile station apparatus even if a certain period of a non-communication state occurs in the mobile station apparatus. An example of such a control method is call control that is based on the "Always-ON" concept in the long term evolution (LTE) system defined by a standard of 3rd Generation Partnership Project (3GPP). Holding a bearer in a core network reduces connection delay at the time of restarting communication.

Related art may include a core network apparatus that determines, upon receipt of an Attach request signal or a position registration request signal from a mobile station, whether or not a continuous connection state in which a bearer for the mobile station is continuously set in a core network is to be permitted (see, for example, Japanese Laid-open Patent Publication No. 2012-23706). The core network apparatus may determine whether or not a continuous connection state is to be permitted, in accordance with at least one of the type of the mobile station, subscriber information about the mobile station, a congestion status of a network, information about a target to which a bearer is connected, QoS information corresponding to the mobile station, regulation information, communication records of the mobile station, the policy of the home network of the mobile station, the policy of the network in which the mobile station exists, and whether or not a certain wireless communication service is provided.

A packet data network gateway (P-GW) interface may provide an instruction to disconnect a core network bearer in a case where communication with a P-GW is not performed via the core network bearer for a certain period (see, for example, Japanese Laid-open Patent Publication No. 2010-183542). The P-GW interface may transmit "Diameter_CC Answer" or "Diameter_Re-Auth Request" including "a timer value (="0" or "∞")" to the P-GW.

Also, there is a technique in which a disconnection detecting unit in a serving general packet radio service (GPRS) support node (SGSN) may detect disconnection of a maintained connection that occurs in a gateway GPRS support node (GGSN) (see, for example, Japanese Laid-open Patent Publication No. 2009-152854). The disconnection detecting unit may notify an Internet protocol (IP)-based service control point (IP-SCP) of the disconnection. In response to the notification, the IP-SCP may specify communication that is to be recovered depending on subscriber contract information in a home location register (HLR). The GGSN may issue a recovery call transmit instruction to transmit a call that prompts a recovery operation, to a mobile apparatus related to the specified communication.

SUMMARY

According to an aspect of the invention, a base station apparatus determines, in accordance with at least one of a communication frequency of a mobile station apparatus, a congestion state of a core network that connects a radio access network and a public network, the number of users being located in a cell of the base station apparatus, and a radio state, a hold period for which a core network resource is to be held, where the core network resource is used for setting a bearer in the core network for the mobile station apparatus. The base station apparatus transmits information indicating the determined hold period to a gateway apparatus in the core network, thereby causing the gateway apparatus to release the core network resource after a period corresponding to the hold period has elapsed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of history data, according to an embodiment;

FIG. 9 is a diagram illustrating an example of a degree-of-priority setting data, according to an embodiment;

DESCRIPTION OF EMBODIMENTS

To set a bearer for a mobile station apparatus in a core network of a communication carrier that connects a radio access network and a public network, various hardware resources of a network apparatus in the core network are used. An example of the hardware resources is the storage capacity of the network apparatus in the core network, which stores identification information and billing information about a network apparatus at a connection destination, and identification information about a mobile station apparatus.

Hereinafter, the above-described core network of a communication carrier may be simply referred to as a "core network." Also, a hardware resource of a network apparatus used for setting a bearer for a mobile station apparatus in a core network may be referred to as a "core network resource."

In a case where a core network resource for a mobile station apparatus whose communication frequency is low is held for a long time, a core network resource for a mobile station apparatus in a non-communication state may be held for a long time. Accordingly, the usage efficiency of the core network resource decreases.

The apparatus or method disclosed in this specification is directed to increasing the usage efficiency of core network resources in a mobile communication system in which core network resources are held after a certain period of a non-communication state.

1. Configuration of Communication System

Hereinafter, an embodiment will be described with reference to the attached drawings. In the following description, an example of long term evolution (LTE) will be described. Note that this example is not intended that the communication system described in this specification is applicable only to a communication system compatible with LTE in a limited manner. The communication system described in this specification is widely applicable to communication systems in which a core network resource is held after a certain period of a non-communication state.

Figure 1:
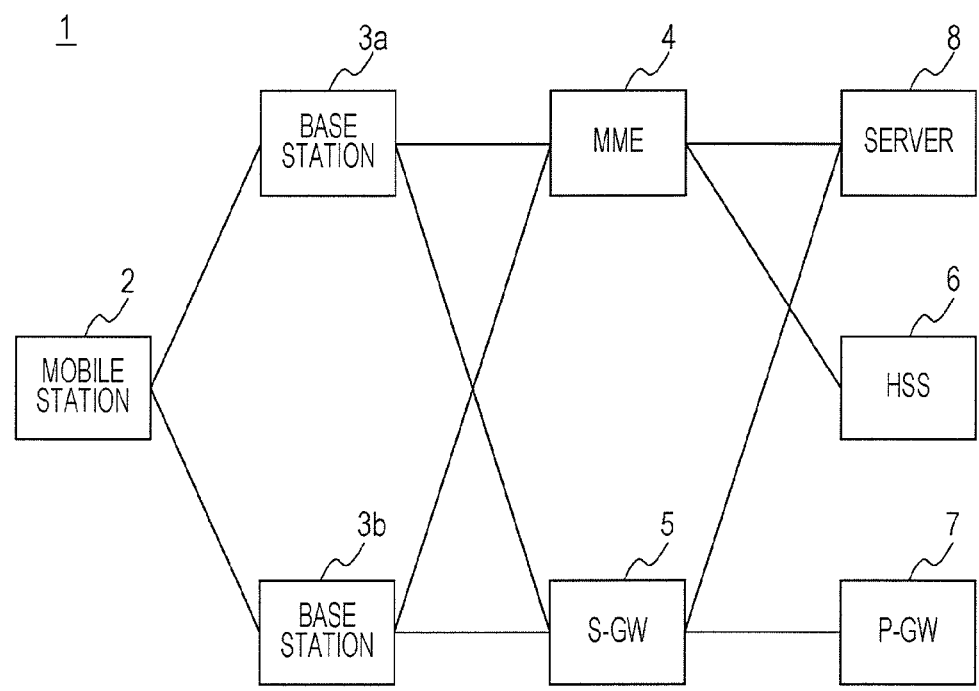
FIG. 1 is a diagram illustrating a configuration example of a communication system, according to an embodiment.

FIG. 1 is a diagram illustrating a configuration example of a communication system, according to an embodiment. The communication system 1 may include a mobile station apparatus 2, base station apparatuses 3a and 3b, a mobility management entity (MME) 4, a serving gateway (S-GW) 5, a home subscriber server (HSS) 6, a packet data network gateway (P-GW) 7, and a server apparatus 8. In the communication system 1, the section from the mobile station apparatus 2 to the S-GW 5 may exist in a radio access network, and the section from the S-GW 5 to the P-GW 7 may exist in a core network.

In the following description and the attached drawings, a mobile station apparatus, a base station apparatus, and a server apparatus may be referred to as a "mobile station," a "base station," and a "server," respectively. Also, the base stations 3a and 3b may be collectively referred to as "base stations 3."

The server 8 may be used to store information indicating the communication status of each mobile station 2. The base station 3 may operate as the server 8. Also, any apparatus in the core network, for example, the MME 4 or the S-GW 5, may operate as the server 8.

2. Outline of Operations

The communication system described in this specification may perform the following operations (a) to (c).
(a) Operation of storing information indicating the communication status of each mobile station apparatus;
(b) Operation of releasing a core network resource after communication ends; and
(c) Control of a mobile station apparatus after communication ends.

Figure 2A:
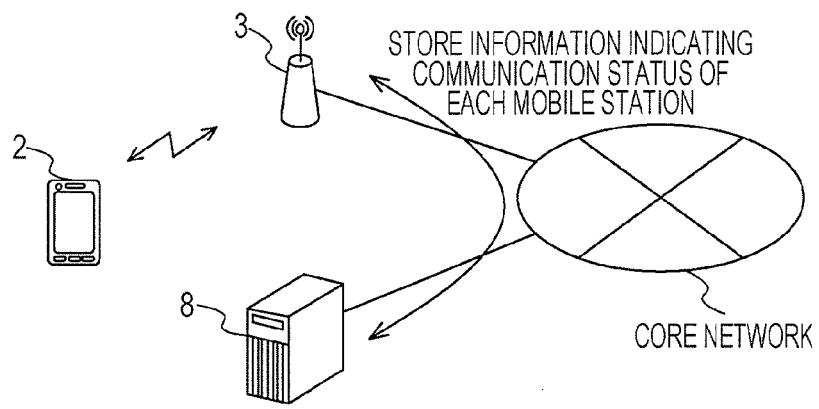
FIGS. 2A to 2C are schematic diagrams illustrating an example of an operation for storing information indicating a communication status of a mobile station apparatus, according to an embodiment.
Figure 2B:
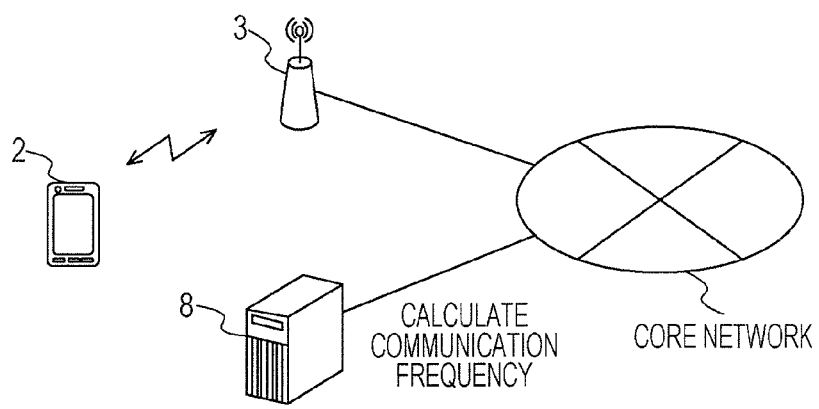
Figure 2C:
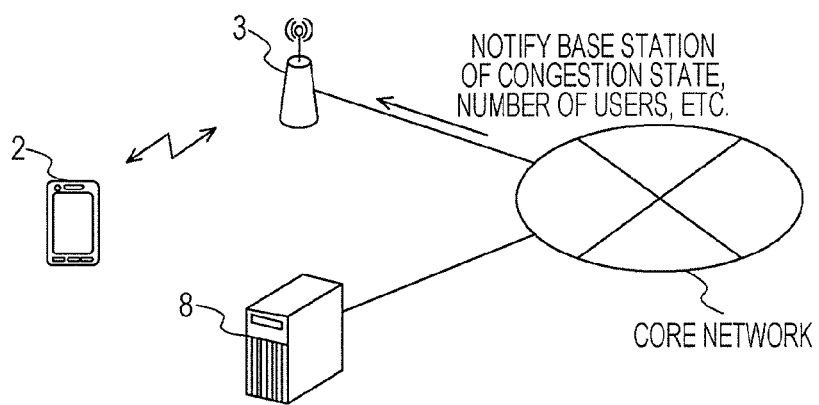

FIGS. 2A to 2C are schematic diagrams illustrating an example of an operation for storing information indicating a communication status of a mobile station apparatus, according to an embodiment. In FIG. 2A, the server 8 may store information indicating the communication status of each mobile station 2. For example, the server 8 may store, for each mobile station 2, information indicating a communication start time and a communication end time of the mobile station 2.

Subsequently, as illustrated in FIG. 2B, the server 8 may calculate, for each mobile station 2, a communication frequency at certain timing, for example, at the time when the mobile station 2 starts communication or at the time when the mobile station 2 ends communication. For example, the server 8 may calculate an average communication interval as a communication frequency. The average communication interval is an average period from when the mobile station 2 ends communication to when the mobile station 2 starts next communication. As illustrated in FIG. 2C, the base station 3 may obtain, from the core network, information indicating the congestion state of the core network and the number of users being located in the serving cell of the base station 3.

The server 8 may calculate a communication frequency by using a home location register (HLR), if the HLR stores the usage status of the mobile station 2.

Figure 3A:
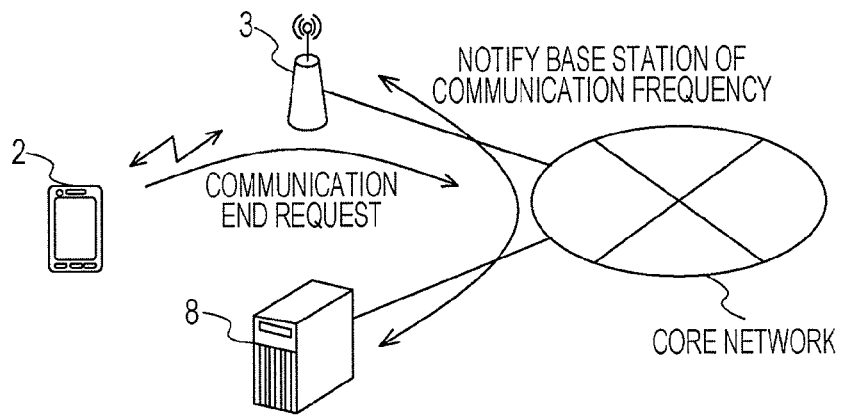
FIGS. 3A to 3C are schematic diagrams illustrating an example of an operation for releasing a core network resource after communication ends, according to an embodiment.
Figure 3B:
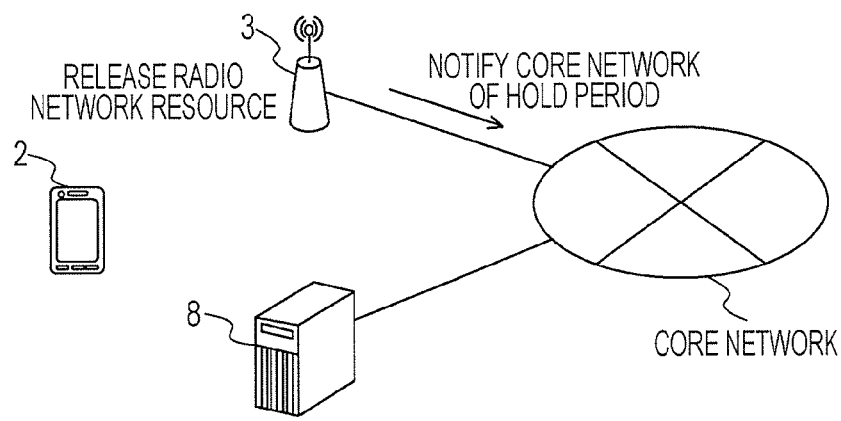
Figure 3C:
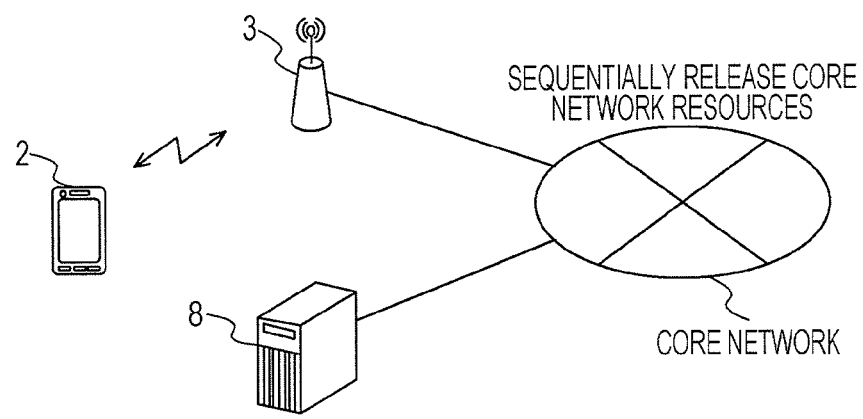

FIGS. 3A to 3C are schematic diagrams illustrating an example of an operation for releasing a core network resource after communication ends, according to an embodiment. As illustrated in FIG. 3A, the server 8 may notify the base station 3 of the communication frequency of the mobile station 2 at the time when the mobile station 2 ends communication.

Subsequently, as illustrated in FIG. 3B, the base station 3 may calculate, on the basis of the communication frequency of the mobile station 2, a hold period for which a core network resource for the base station 2 is to be held. The base station 3 may correct the hold period on the basis of the congestion state of the core network and the number of users being located in the serving cell of the base station 3. The base station 3 may notify the core network of the hold period.

On the other hand, the base station 3 may release a resource for setting a bearer for a mobile station apparatus in the radio access network. Hereinafter, a resource for setting a bearer for a mobile station apparatus in the radio access network may be referred to as a "radio section resource." The radio section resource may include, for example, a radio resource such as the frequency and time slot of a radio signal used in wireless communication. The radio section resource may include, for example, the storage capacity of the base station 3 or the S-GW 5 that stores the identifier information of the mobile station 2, a buffer and the identifier information thereof, and the identifier information of an apparatus at a connection destination.

As illustrated in FIG. 3C, in a case where the core network does not receive a communication request for restarting communication from the mobile station 2 even after a period corresponding to the reported hold period elapses, the core network may release the core network resource. The period for which the core network resource is to be held is determined in accordance with the average communication interval of the mobile station 2, and thus the usage efficiency of the core network resource increases. The core network may sequentially release a plurality of core network resources, in accordance with priority that is determined based on the available capacity or acquisition time of each core network resource.

Figure 4A:
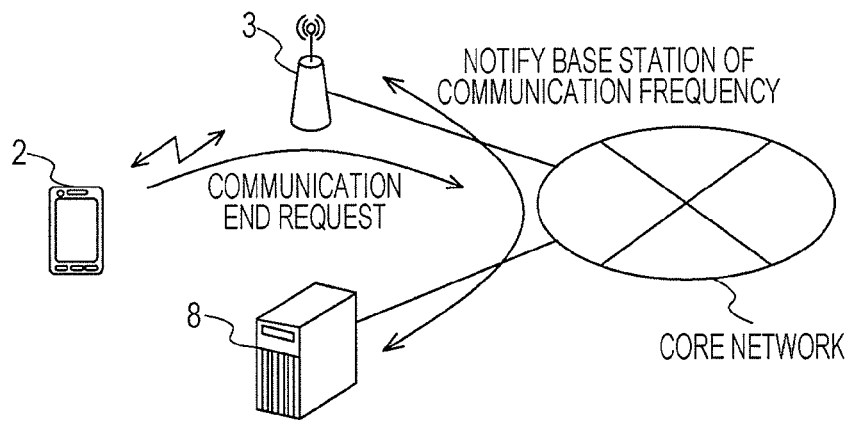
FIGS. 4A to 4C are schematic diagrams illustrating an example of control performed on a mobile station apparatus after communication ends, according to an embodiment.
Figure 4B:
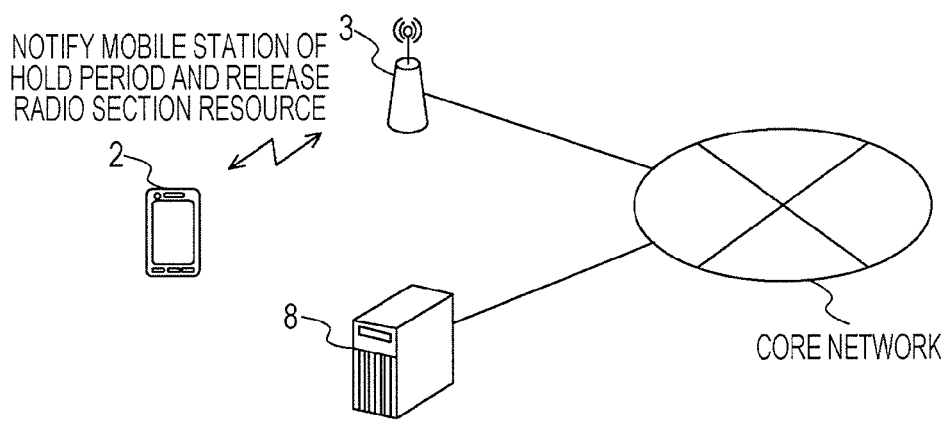
Figure 4C:
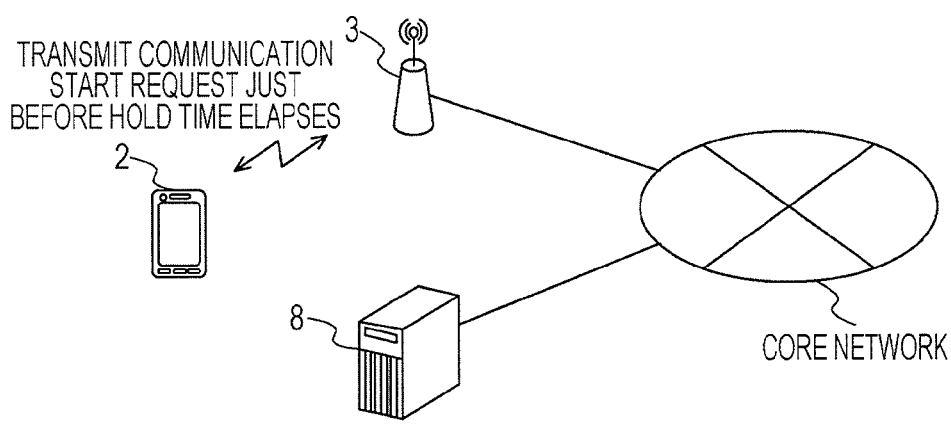

FIGS. 4A to 4C are schematic diagrams illustrating an example of control performed on a mobile station apparatus after communication ends, according to an embodiment. As illustrated in FIG. 4A, at the time when the mobile station 2 ends communication, the server 8 may notify the base station 3 of the communication frequency of the mobile station 2.

Subsequently, as illustrated in FIG. 4B, the base station 3 may calculate a hold period on the basis of the communication frequency of the mobile station 2. Also, the base station 3 may correct the hold period. The base station 3 may notify the mobile station 2 of the hold period. Then, the base station 3 may release the radio section resource.

As illustrated in FIG. 4C, in a case where the mobile station 2 has data to be transmitted, the mobile station 2 may temporarily suspend transmission of a communication request in accordance with the reported hold period, and may transmit the communication request at the timing determined in accordance with the hold period. For example, the mobile station 2 may transmit the communication request just before the hold period elapses. The mobile station 2 may temporarily suspend only transmission of data having low real-time requirements, and may immediately transmit a signal and data having high real-time requirements. An example of data having low real-time requirements is data for schedule synchronization, social networking service (SNS) synchronization, and voice over Internet protocol (VoIP) synchronization. An example of a signal and data having high real-time requirements is a voice call or an e-mail.

As described above, a communication request of the mobile station 2 is suspended in the period corresponding to the hold period, and accordingly the load on the radio access network decreases. On the other hand, in a case where the mobile station 2 transmits a communication request just before the hold period elapses, connection delay that occurs at the time of reconnection decreases, and an increase in the load on the core network due to the repetition of release and acquisition of a core network resource decreases.

3. Functional Configuration

Figure 5:
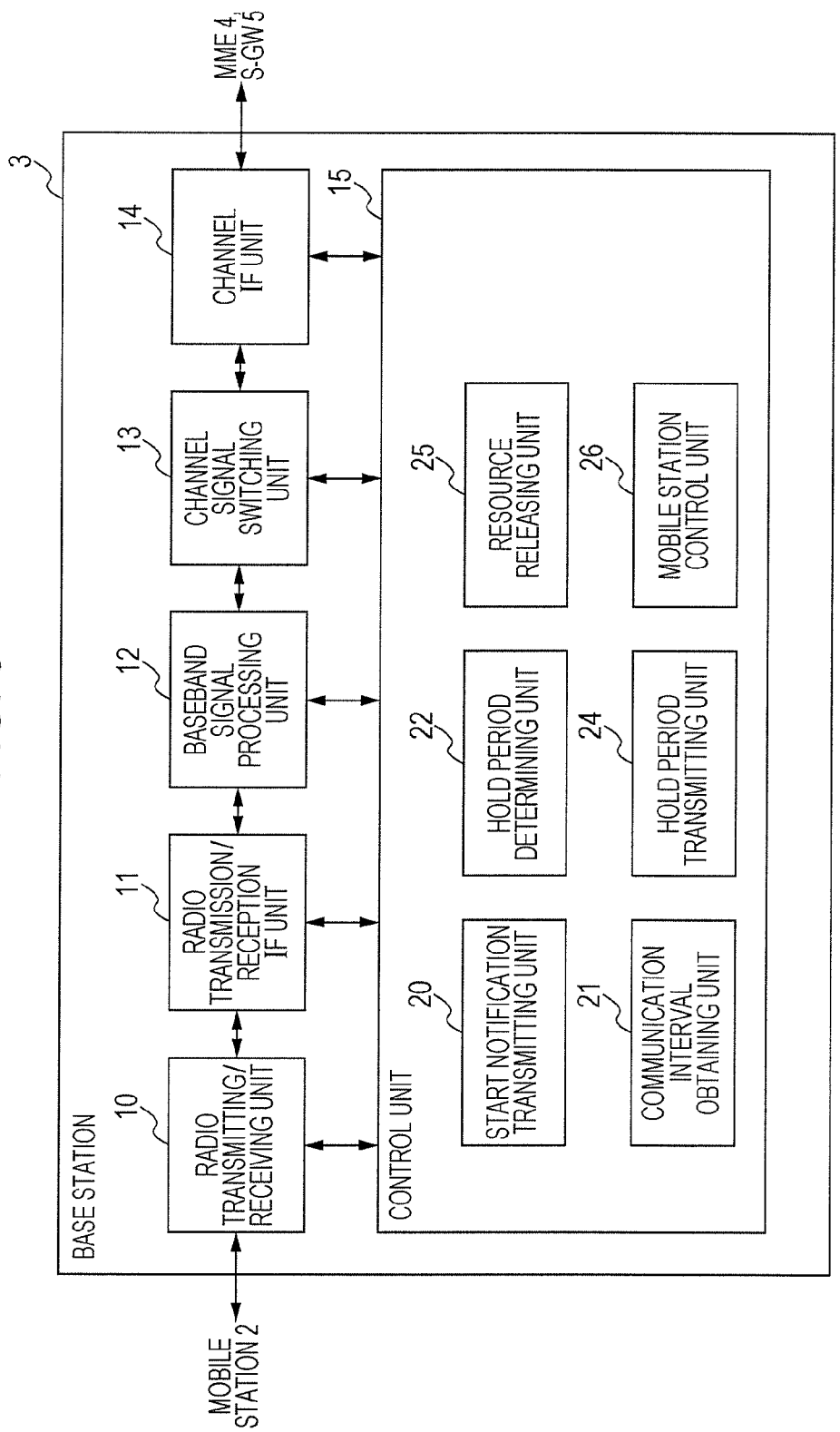
FIG. 5 is a diagram illustrating an example of a functional configuration of a base station, according to an embodiment.

Next, the configurations and operations of the individual apparatuses will be described in more detail. FIG. 5 is a diagram illustrating an example of a functional configuration of a base station, according to an embodiment. The base station 3 includes a radio transmitting/receiving unit 10, a radio transmission/reception interface unit 11, a baseband signal processing unit 12, a channel signal switching unit 13, a channel interface unit 14, and a control unit 15. In the following description and the attached drawings, an interface may be referred to as an "IF".

The radio transmitting/receiving unit 10 may perform transmission/reception processing of control signals and radio signals of user traffic that are transmitted and received between the base station 3 and the mobile station 2. The radio transmission/reception IF unit 11 is a signal interface between the radio transmitting/receiving unit 10 and the baseband signal processing unit 12. The baseband signal processing unit 12 may perform encoding and modulation of control signals and user traffic, decoding and demodulation thereof, communication protocol processing, and processing of baseband signals related to scheduling.

The channel signal switching unit 13 may perform multiplexing and demultiplexing of signals transmitted in the base station 3. The channel IF unit 14 may perform transmission/reception processing of signals in a wired network between the base station 3, and the MME 4 and the S-GW 5.

The control unit 15 may control the operations of the base station 3. The control unit 15 may include a start notification transmitting unit 20, a communication interval obtaining unit 21, a hold period determining unit 22, a hold period transmitting unit 24, a resource releasing unit 25, and a mobile station control unit 26.

Upon detecting the start of communication performed by the mobile station 2, the start notification transmitting unit 20 may transmit to the sever 8 a start notification, which indicates that communication performed by the mobile station 2 has started. The start notification transmitting unit 20 may detect the start of communication in response to the receipt of a radio bearer setting response signal that is transmitted from the mobile station 2 in an Attach procedure. Alternatively, the start notification transmitting unit 20 may detect the start of communication in response to the receipt of a radio bearer setting response signal that is transmitted from the mobile station 2 in a procedure of transmission performed by the mobile station 2 that is in an Attach state. The start notification may include the identifier of the target mobile station 2. Also, the start notification may include information indicating the start time of communication performed by the mobile station 2.

Upon detecting the end of communication performed by the mobile station 2, the communication interval obtaining unit 21 may request the server 8 to transmit information indicating the communication frequency of the mobile station 2. For example, the communication interval obtaining unit 21 may transmit to the server 8 a communication interval transmission request for requesting the server 8 to transmit information indicating an average communication interval, which is an index indicating the communication frequency. Hereafter, the embodiment will be described using an example in which the average communication interval of the mobile station 2 is used as an index indicating the communication frequency of the mobile station 2. Note that this example is not intended that the index indicating a communication frequency used in the communication system 1 described in this specification is limited to only an average communication interval.

The communication interval obtaining unit 21 may detect the end of communication in response to, for example, a call release request from the mobile station 2, or may detect the end of communication in response to other call end processing. Alternatively, for example, the communication interval obtaining unit 21 may detect the end of communication in a case where user traffic that is transmitted and received between the base station 3 and the mobile station 2 is not generated for a certain period. The communication interval transmission request may include the identifier of the target mobile station 2. The communication interval transmission request may include information indicating the communication end time of the mobile station 2.

The server 8 may transmit a response request to the base station 3 in response to the communication interval transmission request. In a case where the server 8 stores information indicating the communication status of the target mobile station 2, the response request may include information indicating an average communication interval, which is an index of the communication frequency of the target mobile station 2. The communication interval obtaining unit 21 may receive the response request.

The hold period determining unit 22 may determine, for each mobile station 2, the hold period of a core network resource for the mobile station 2 in accordance with an average communication interval. The hold period determining unit 22 may determine the hold period by using, for example, the following equation (1).

$$\text{Hold period} = \text{Average communication interval} + \text{Offset } \alpha \quad (1)$$

The hold period determining unit 22 may correct the hold period in accordance with at least one of conditions obtained from the core network by the base station 3, such as the number of users being located in the serving cell, and the congestion state of the core network. Alternatively or additionally, the hold period determining unit 22 may correct the hold period in accordance with at least one of conditions, such as a radio quality state and the availability of the resources of the base station 3. The resources of the base station 3 may include, for example, the load capacity and storage capacity of a processor, or the radio resources of the cell of the base station 3.

For example, the hold period determining unit 22 may increase the hold period in a case where the number of users being located in the serving cell is less than or equal to a threshold, and may decrease the hold period in a case where the number of users being located in the serving cell is greater than the threshold. The hold period determining unit 22 may decrease the hold period in a case where the congestion state of the core network is worse than a standard, and may increase the hold period in a case where the congestion state is at the standard or is better than the standard. The hold period determining unit 22 may increase the hold period in a case where the radio quality state is higher than or equal to a threshold, and may decrease the hold period in a case where the radio quality state is lower than the threshold. The hold period determining unit 22 may increase the hold period in a case where the available capacity of the resources of the base station 3 is greater than or equal to a threshold, and may decrease the hold period in a case where the available capacity of the resources is less than the threshold.

Further, the hold period determining unit 22 may determine the hold period on the basis of at least one of the number of users being located in the serving cell, the congestion state of the core network, the radio quality state, and the availability of the resources of the base station 3, without using the average communication interval obtained from the server 8.

The hold period transmitting unit 24 may transmit information indicating the corrected hold period to the S-GW 5. To transmit the information indicating the corrected hold period to the S-GW 5, the hold period transmitting unit 24 may cause a network apparatus other than the S-GW 5 to relay the transmission of the information. For example, the information indicating the corrected hold period may be stored in a user equipment (UE) context release request signal (described below) transmitted by the resource releasing unit 25, and the signal may be transmitted to the MME 4. The MME 4 may transmit a bearer update request signal to the S-GW 5 in response to the receipt of the UE context release request signal. At this time, the MME 4 may store information indicating the hold period in the bearer update request signal. In this case, the resource releasing unit 25 may execute processing of transmitting the information indicating the hold period to the S-GW 5.

Upon the end of communication performed by the mobile station 2 being detected, the resource releasing unit 25 may execute processing of releasing a radio section resource. For example, the resource releasing unit 25 may release the radio resource allocated to the mobile station 2. Also, for example, the resource releasing unit 25 may transmit a UE context release request signal, which is an S1-AP protocol message for requesting release of UE context of the mobile station 2, to the MME 4.

The mobile station control unit 26 may transmit information indicating the corrected hold period to the mobile station 2. The mobile station control unit 26 may store the information indicating the hold period in a radio link release signal that is transmitted to the mobile station 2 at the time of release of the radio resource.

Figure 6:
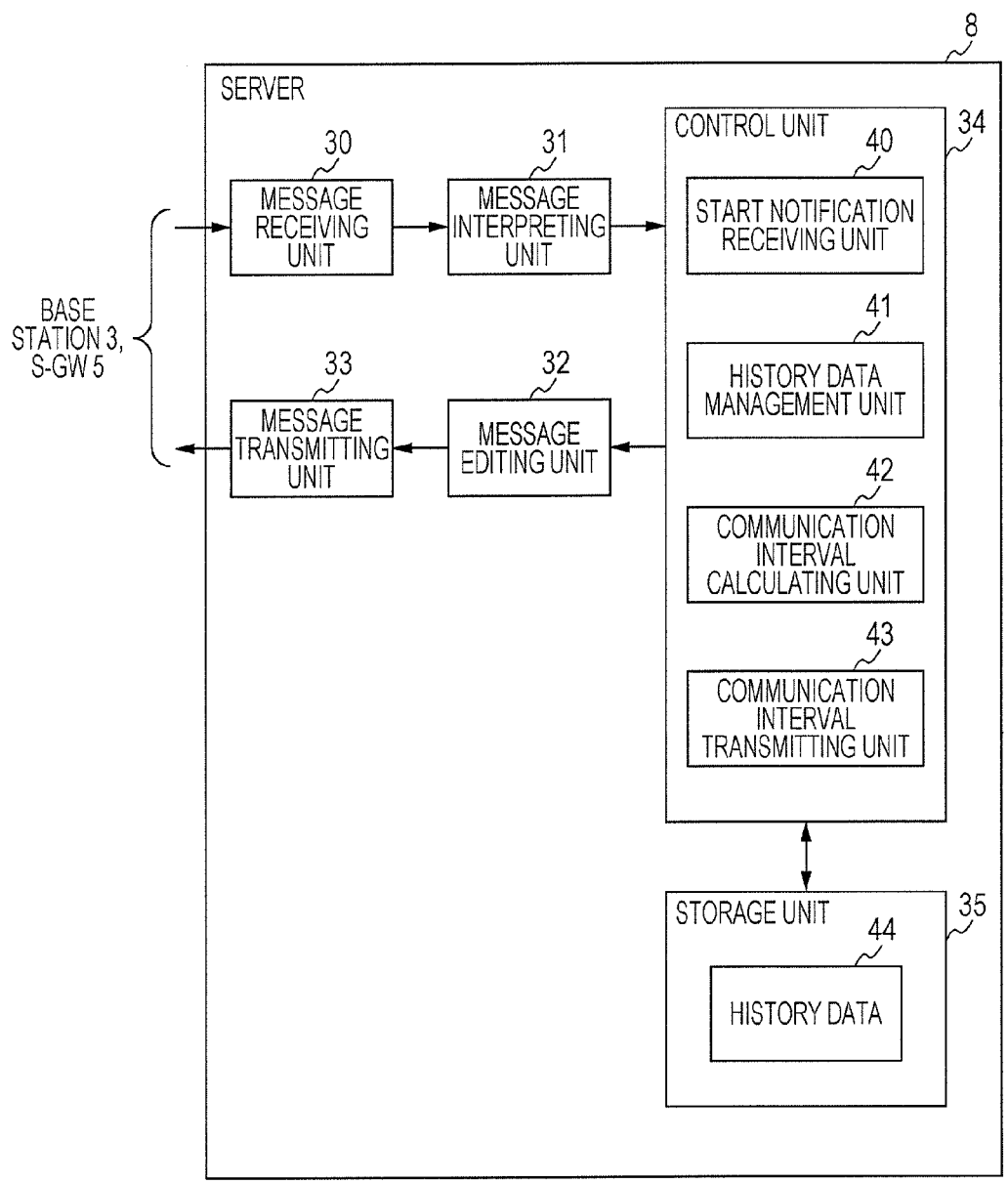
FIG. 6 is a diagram illustrating an example of a functional configuration of a server, according to an embodiment.

FIG. 6 is a diagram illustrating an example of a functional configuration of a server, according to an embodiment. The server 8 may include a message receiving unit 30, a message interpreting unit 31, a message editing unit 32, a message transmitting unit 33, a control unit 34, and a storage unit 35.

The message receiving unit 30 may perform processing of receiving a message that is transmitted from the base station 3 via the S-GW 5 connected via a wired network. The message interpreting unit 31 may interpret the received message in accordance with a certain communication protocol, and output information stored in the message to the control unit 34. The message editing unit 32 may store the information output from the control unit 34 in a message that is to be transmitted based on a certain communication protocol. The message transmitting unit 33 may perform processing of transmitting a message that is transmitted to the base station 3 via the S-GW 5.

The control unit 34 may control the operations of the server 8. The control unit 34 may include a start notification receiving unit 40, a history data management unit 41, a communication interval calculating unit 42, and a communication interval transmitting unit 43. The start notification receiving unit 40 may receive a start notification, which is a notification about the start of communication performed by the mobile station 2, from the base station 3. In response to the receipt of the start notification, the start notification receiving unit 40 may transmit a start notification response to the base station 3.

The history data management unit 41 may store, in history data 44 stored in the storage unit 35, information indicating the communication start time of the mobile station 2, which is specified by the start notification. For example, the history data management unit 41 may obtain, as a communication start time, the time at which the start notification was received. The history data management unit 41 may obtain, from the start notification, information indicating the communication start time.

FIG. 7 is a diagram illustrating an example of history data, according to an embodiment. The history data 44 may be stored in the storage unit 35 for each mobile station 2. The history data 44 may include information elements "communication start time," "communication end time," and "communication interval." The information elements "communication start time" and "communication end time" represent the start time and the end time of each communication operation, respectively. The information element "communication interval" represents the interval between the start time of each communication operation and the end time of the preceding communication operation.

For example, the communication start time of the second entry of the history data 44 illustrated in FIG. 7 is "9:00," and the communication end time of the first entry for the preceding communication is "8:10." Thus, the communication interval of the second entry is "50" minutes.

Referring back to FIG. 6, upon receipt of a start notification, the communication interval calculating unit 42 may calculate the communication interval between the present communication and the preceding communication. The communication interval calculating unit 42 may calculate, as the communication interval, the difference between the communication start time received this time and the communication end time indicated by the information stored in an entry preceding the entry in which information indicating the present communication start time is stored. The history data management unit 41 may store information indicating the communication interval in the history data 44. The communication interval calculating unit 42 may calculate, as an index of the communication frequency of the mobile station 2, the average communication interval of the communication intervals stored in all the entries of the history data 44 for the mobile station 2, and may store information indicating the average communication interval in the storage unit 35.

The communication interval transmitting unit 43 may receive a communication interval transmission request that is transmitted from the base station 3. In response to the receipt of the communication interval transmission request, the communication interval transmitting unit 43 may transmit a response request to the base station 3. In a case where information indicating the average communication interval calculated for the mobile station 2 specified by the communication interval transmission request is stored in the storage unit 35, the communication interval transmitting unit 43 may transmit a response request including the information indicating the average communication interval.

The history data management unit 41 may store, in the history data 44, information indicating the communication end time of the mobile station 2. For example, the history data management unit 41 may obtain, as the communication end time, information indicating the time at which the communication interval transmission request was received. The history data management unit 41 may obtain information indicating the communication end time included in the communication interval transmission request.

Figure 8:
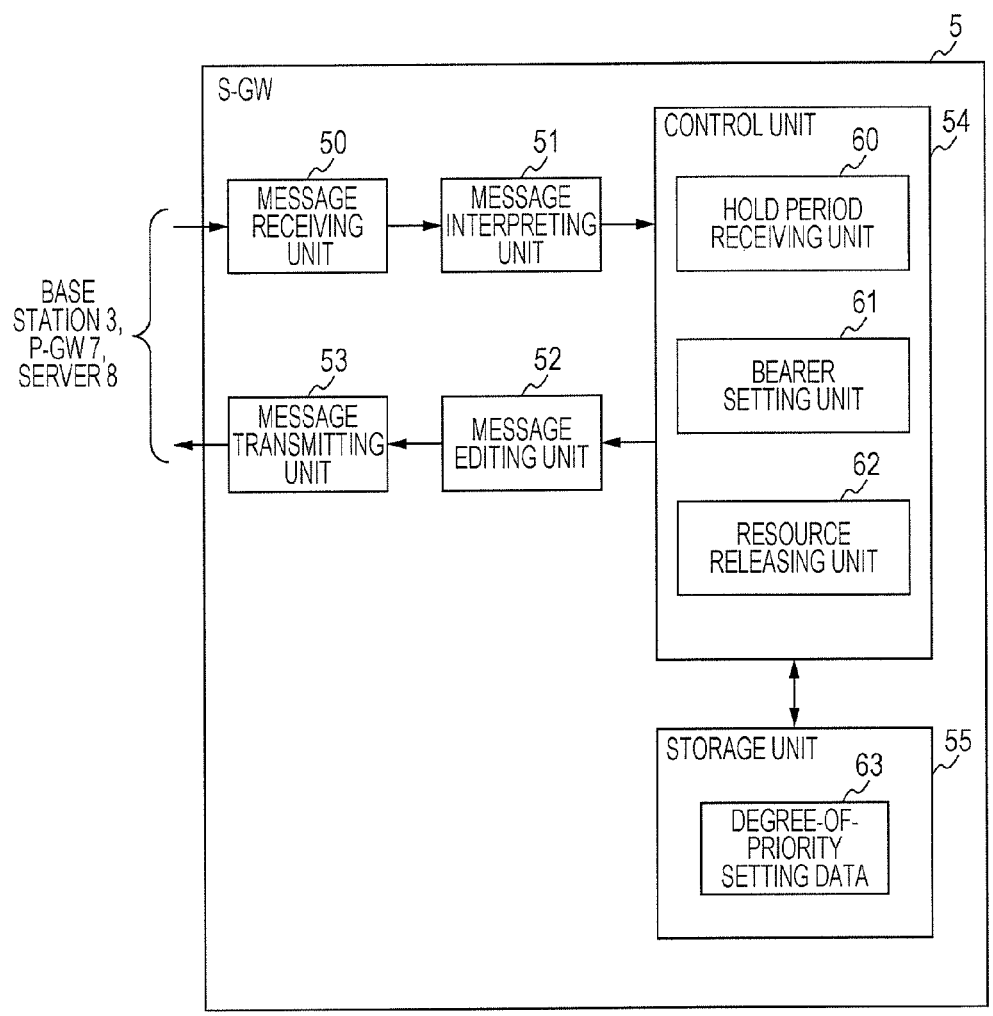
FIG. 8 is a diagram illustrating an example of a functional configuration of a serving gateway (S-GW), according to an embodiment.

FIG. 8 is a diagram illustrating an example of a functional configuration of an S-GW, according to an embodiment. The S-GW 5 may include a message receiving unit 50, a message interpreting unit 51, a message editing unit 52, a message transmitting unit 53, a control unit 54, and a storage unit 55.

The message receiving unit 50 may receive messages that are transmitted from the base station 3, the P-GW 7, and the server 8 connected via the wired network. The message interpreting unit 51 may interpret a received message in accordance with a certain communication protocol, and may output information stored in the message to the control unit 54. The message editing unit 52 may store information output from the control unit 54 in a message that is to be transmitted according to a certain communication protocol. The message transmitting unit 53 may transmit the message to the base station 3 via the S-GW 5.

The control unit 54 may control the operations of the S-GW 5. The control unit 54 may include a hold period receiving unit 60, a bearer setting unit 61, and a resource releasing unit 62. The hold period receiving unit 60 may receive information indicating a hold period, from the base station 3a or network apparatus that relays information indicating a hold period transmitted from the base station 3.

The bearer setting unit 61 may receive a bearer setting request and a bearer update request from the MME 4, and may perform processing of setting and updating a bearer in the core network for the mobile station 2. As in the above-described case where information indicating a hold period is stored in the bearer update request, the bearer setting unit 61 may execute processing of receiving the information indicating the hold period.

In the case of not receiving a communication request for restarting communication from the mobile station 2 after a period corresponding to the reported hold period elapses, the resource releasing unit 62 may release a core network resource. The resource releasing unit 62 may sequentially release a plurality of core network resources in descending order of priority that is predetermined in accordance with the available capacity and acquisition time of each core network resource. The storage unit 55 may store degree-of-priority setting data 63 that indicates the order in which the core network resources are to be released.

FIG. 9 is a diagram illustrating an example of a degree-of-priority setting data, according to an embodiment. The degree-of-priority setting data 63 may include information elements "priority," "resource ID," "hold period," and "maximum hold period." The information elements "priority" and "resource ID" indicate the order in which the individual resources are to be released and the identifiers of the individual resources, respectively.

The information element "hold period" indicates the hold periods of the individual resources, each hold period being determined in accordance with information indicating a hold period transmitted from the base station 3. For example, in the example of FIG. 9, the information element "hold period" indicates the hold periods of the individual resources, which are expressed by percentages (%) with respect to the hold period indicated by the information transmitted from the base station 3. In a case where the hold period indicated by the information transmitted from the base station 3 is T, the hold periods of the individual resources having resource IDs X, Y, and Z are 0.1×T, 0.2×T, and 0.8×T, respectively. "Maximum hold period" indicates the maximum hold periods of the individual resources.

In a case where the resource releasing unit 62 does not receive a communication request for restarting communication from the mobile station 2 within the shorter one of the hold period and the maximum hold period that are designated by the degree-of-priority setting data 63 for each core network resource, the resource releasing unit 62 may release each core network resource.

Figure 10:
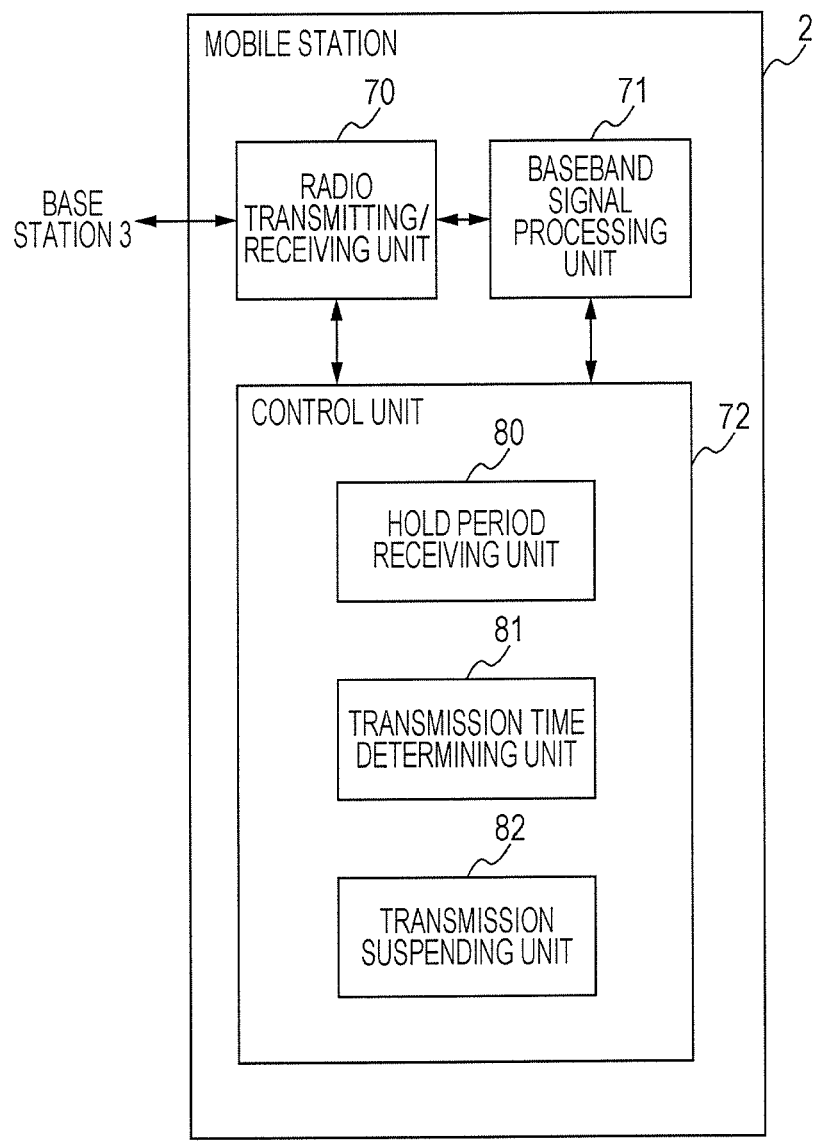
FIG. 10 is a diagram illustrating an example of a functional configuration of a mobile station, according to an embodiment.

FIG. 10 is a diagram illustrating an example of a functional configuration of a mobile station, according to an embodiment. The mobile station 2 may include a radio transmitting/receiving unit 70, a baseband signal processing unit 71, and a control unit 72.

The radio transmitting/receiving unit 70 may perform processing of transmitting and receiving control signals and radio signals of user traffic that are transmitted and received between the mobile station 2 and the base station 3. The baseband signal processing unit 71 may perform encoding and modulation of control signals and user traffic, decoding and demodulation thereof, and processing of baseband signals related to communication protocol processing.

The control unit 72 may control the operations of the base station 3. The control unit 72 may include a hold period receiving unit 80, a transmission time determining unit 81, and a transmission suspending unit 82. The hold period receiving unit 80 may receive information indicating a hold period from the base station 3.

The transmission time determining unit 81 may determine a transmission time at which data is to be transmitted next time, on the basis of the information indicating the hold period received from the base station 3. The transmission time determining unit 81 may determine a time that comes immediately before the hold period elapses, to be the next transmission time, for example. The transmission time determining unit 81 may determine a transmission time by using the following equation (2).

$$\text{Transmission time} = \text{Present time} + \text{Received hold period} - \text{Offset } \beta \qquad (2)$$

In a case where a transmission request for transmitting a signal or data is generated, the transmission suspending unit 82 may determine whether the priority of the generated transmission request is relatively high or relatively low. For example, the transmission suspending unit 82 may determine the priority of a transmission request having high real-time requirements to be relatively high, and may determine the priority of a transmission request having low real-time requirements to be relatively low. An example of a transmission request having high real-time requirements is a transmission request for transmitting a voice call or an e-mail. Examples of a transmission request having low real-time requirements include a transmission request for schedule synchronization, SNS synchronization, and VoIP synchronization.

In a case where the priority of a generated transmission request is relatively low, the transmission suspending unit 82 may suspend transmission of data until the hold period determined by the transmission time determining unit 81 elapses. In a case where the priority of a generated transmission request is relatively high, the transmission suspending unit 82 may transmit data before the hold period determined by the transmission time determining unit 81 elapses.

4. Description of Operations

4.1 Operations at the Start of Communication

Figure 11:
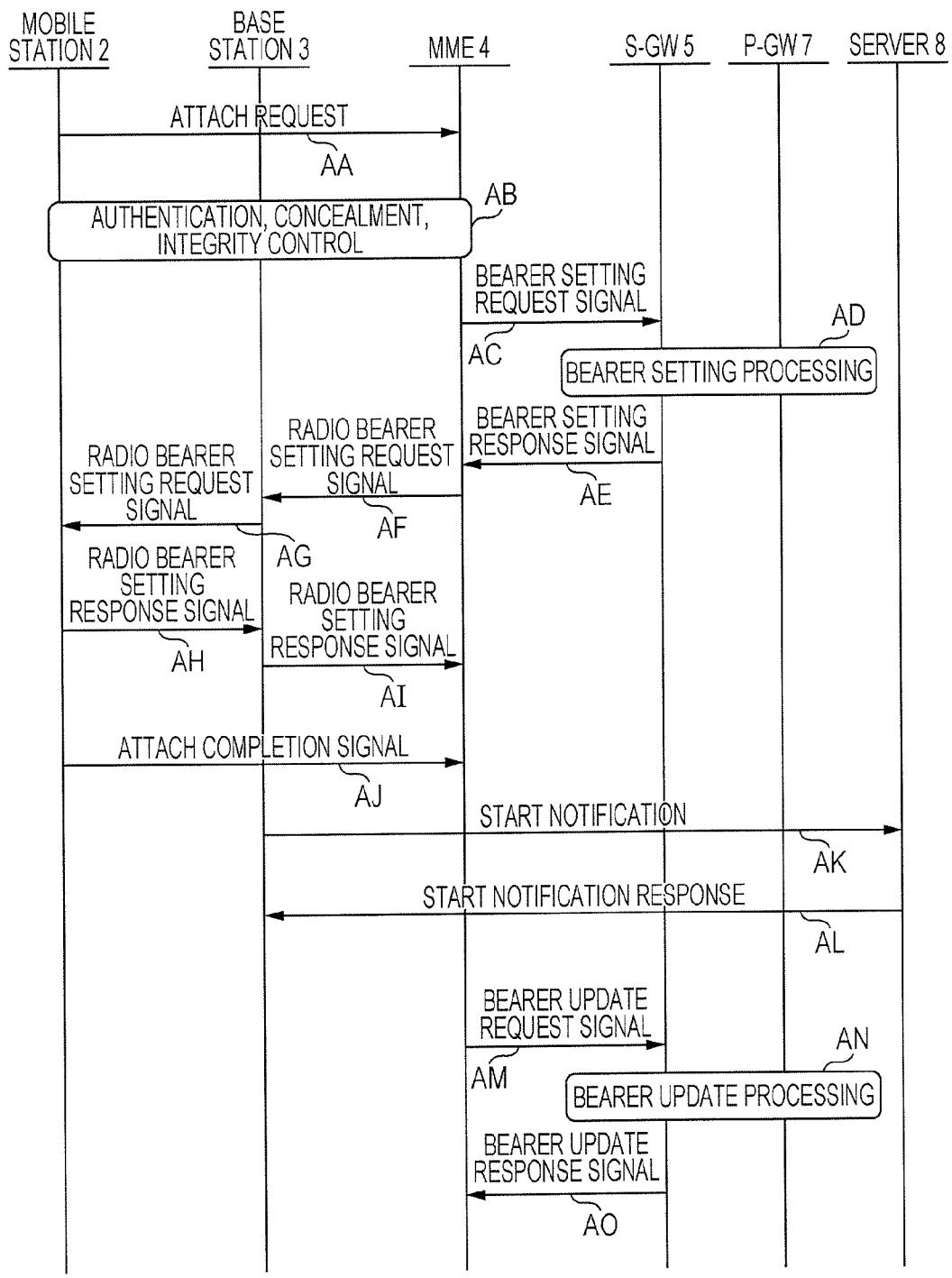
FIG. 11 is a diagram illustrating an example of an operational sequence performed by a communication system at the start of communication, according to an embodiment.

FIG. 11 is a diagram illustrating an example of an operational sequence performed by a communication system at the start of communication, according to an embodiment. In operation AA, the mobile station 2 may transmit an Attach request to the MME 4. In operation AB, the MME 4 may perform user authentication by using authentication information obtained from the HSS 6, and may obtain contract information used for bearer setting from the HSS 6.

In operation AC, the MME 4 may select the S-GW 5 and the P-GW 7 to which a bearer is to be set, by using a domain name system (DNS) on the basis of an access point name (APN) received from the mobile station 2. The MME 4 may transmit a bearer setting request signal to the selected S-GW 5.

In operation AD, the S-GW 5 may perform bearer setting processing on the P-GW 7 that is set by the bearer setting request signal. After the bearer setting between the S-GW 5 and the P-GW 7 has been completed, in operation AE, the S-GW 5 may store transmission information for the base station 3 in a bearer setting response signal and may transmit the bearer setting response signal.

In operation AF, the MME 4 may transmit the transmission information received from the S-GW 5, which serves as a radio bearer setting request signal, to the base station 3. The radio bearer setting request may include an Attach acceptance signal for the mobile station 2.

In operation AG, the base station 3 may establish a radio bearer between the base station 3 and the mobile station 2, and may transmit the radio bearer setting request signal and the Attach acceptance signal to the mobile station 2. In operation AH, the base station 3 may receive a radio bearer setting response signal from the mobile station 2. In operation AI, the base station 3 may transmit transmission information for the S-GW 5, which serves as a radio bearer setting response signal, to the MME 4. In operation AJ, the mobile station 2 may transmit an Attach completion signal to the MME 4.

The base station 3 that has received the radio bearer setting response signal from the mobile station 2 may transmit a start notification to the server 8 in operation AK. The server 8 may store, in the history data 44, information indicating the communication start time of the mobile station 2 and the communication interval with respect to the preceding communication. In operation AL, the server 8 may transmit a start notification response to the base station 3.

The MME 4 that has received the Attach completion signal may transmit to the S-GW 5, in operation AM, the transmission information received from the base station 3, which serves as a bearer update request signal. In operation AN, the S-GW 5 may complete the bearer setting between the base station 3 and the S-GW 5 by using the received transmission information. In operation AO, the S-GW 5 may transmit a bearer update response signal to the MME 4.

Figure 12:
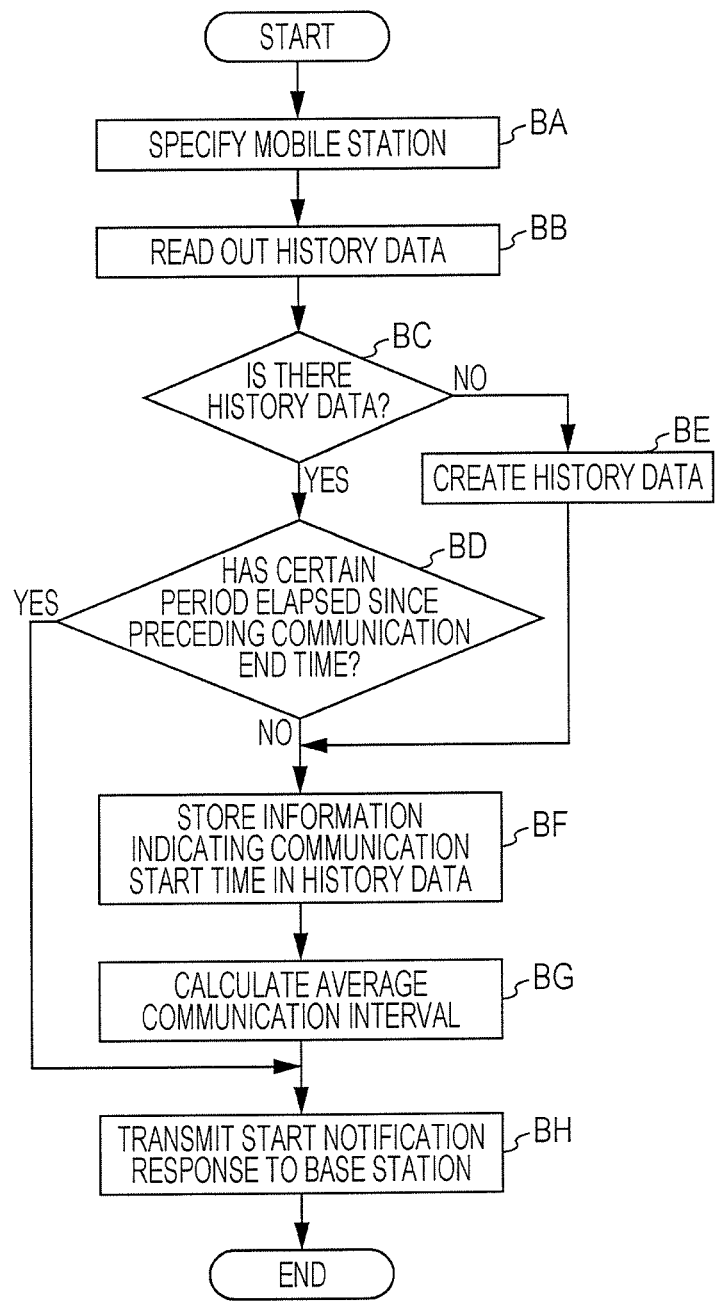
FIG. 12 is a diagram illustrating an example of an operational flowchart performed by a server at the start of communication, according to an embodiment.

FIG. 12 is a diagram illustrating an example of an operational flowchart performed by a server at the start of communication, according to an embodiment. When the start notification receiving unit 40 of the server 8 receives a start notification from the base station 3, in operation BA, the history data management unit 41 may specify the mobile station 2 that has started communication, on the basis of the identifier of the mobile station 2 included in the start notification.

In operation BB, the history data management unit 41 may attempt to read out the history data 44 created for the mobile station 2. In operation BC, the history data management unit 41 may determine whether or not there is the history data 44 created for the mobile station 2. When there is the history data 44 (YES in operation BC), the operation proceeds to operation BD. when there is not the history data 44 (NO in operation BC), the operation proceeds to operation BE.

In operation BD, the history data management unit 41 may determine whether or not a certain period has elapsed since the preceding communication end time. When the certain period has not elapsed (NO in operation BD), the operation proceeds to operation BF. When the certain period has elapsed (YES in operation BD), it is presumed that the power of the mobile station 2 has been in an OFF-state or the mobile station 2 has been located the serving cell, and thus the operation proceeds to operation BH without storing information indicating the start time.

In operation BE, the history data management unit 41 may create the history data 44 for the mobile station 2. After that, the operation may proceed to operation BF. In operation BF, the history data management unit 41 may store information indicating a communication start time in the history data 44.

In operation BG, the communication interval calculating unit 42 may calculate the communication interval between the present communication and the preceding communication. The history data management unit 41 may store information indicating the communication interval in the history data 44. The communication interval calculating unit 42 may calculate the average communication interval of the communication intervals stored in all the entries of the history data 44 for the mobile station 2, and may store information indicating the average communication interval in the storage unit 35. In operation BH, the start notification receiving unit 40 may transmit a start notification response to the base station 3. Accordingly, the operations performed by the server 8 at the start of communication end.

Figure 13:
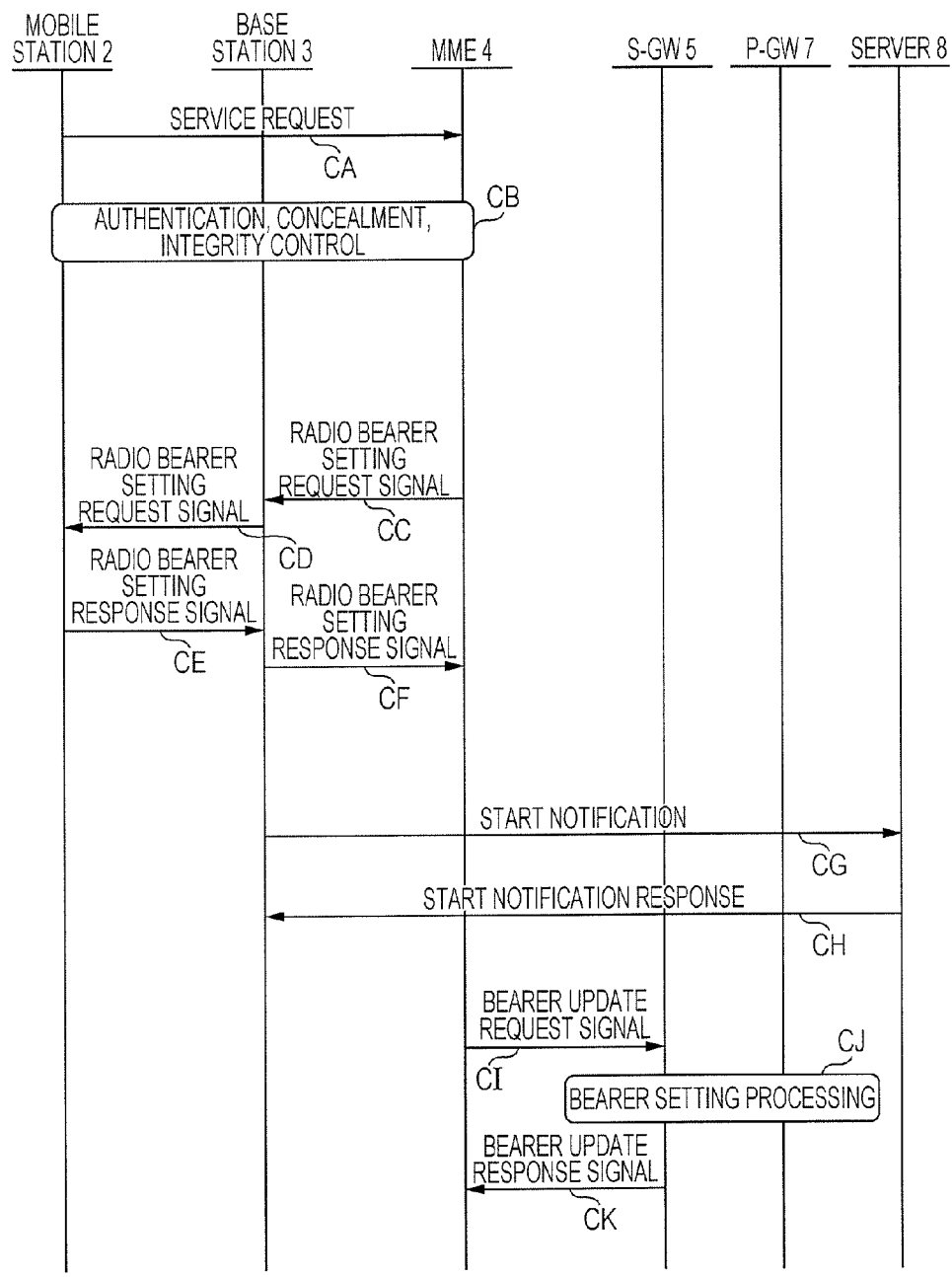
FIG. 13 is a diagram illustrating an example of an operational sequence performed by a communication system at the start of communication, according to an embodiment.

FIG. 13 is a diagram illustrating an example of an operational sequence performed by a communication system at the start of communication, according to an embodiment. In the operations illustrated in FIG. 13, the mobile station 2 in an Attach state may start communication. In operation CA, the mobile station 2 in an Attach state may transmit a service request to the MME 4 when starting communication.

In operation CB, the MME 4 may perform user authentication on the basis of authentication information obtained from the HSS 6, and may obtain contract information used for bearer setting from the HSS 6. In operation CC, the MME 4 may transmit a radio bearer setting request signal to the base station 3. In operation CD, the base station 3 may establish a radio bearer between the mobile station 2 and the base station 3, and may transmit the radio bearer setting request signal to the mobile station 2.

In operation CE, the base station 3 may receive a radio bearer setting response signal from the mobile station 2. In operation CF, the bases station 3 may transmit transmission information for the S-GW 5, which serves as a radio bearer setting response signal, to the MME 4.

The base station 3 that has received the radio bearer setting response signal from the mobile station 2 may transmit a start notification to the server 8 in operation CG. The server 8 may store, in the history data 44, information indicating the communication interval between the communication start time and the preceding communication end time of the mobile station 2. In operation CH, the server 8 may transmit a start notification response to the base station 3. These operations CG and CH are similar to the operations AK and AL described above with reference to FIG. 11.

In operation CI, the MME 4 may transmit the transmission information received from the base station 3, which serves as a bearer update request signal, to the S-GW 5. In operation CJ, the S-GW 5 may complete bearer setting between the base station 3 and the S-GW 5 on the basis of the received transmission information. In operation CK, the S-GW 5 may transmit a bearer update response signal to the MME 4.

4.2 Operations at the End of Communication

Figure 14:
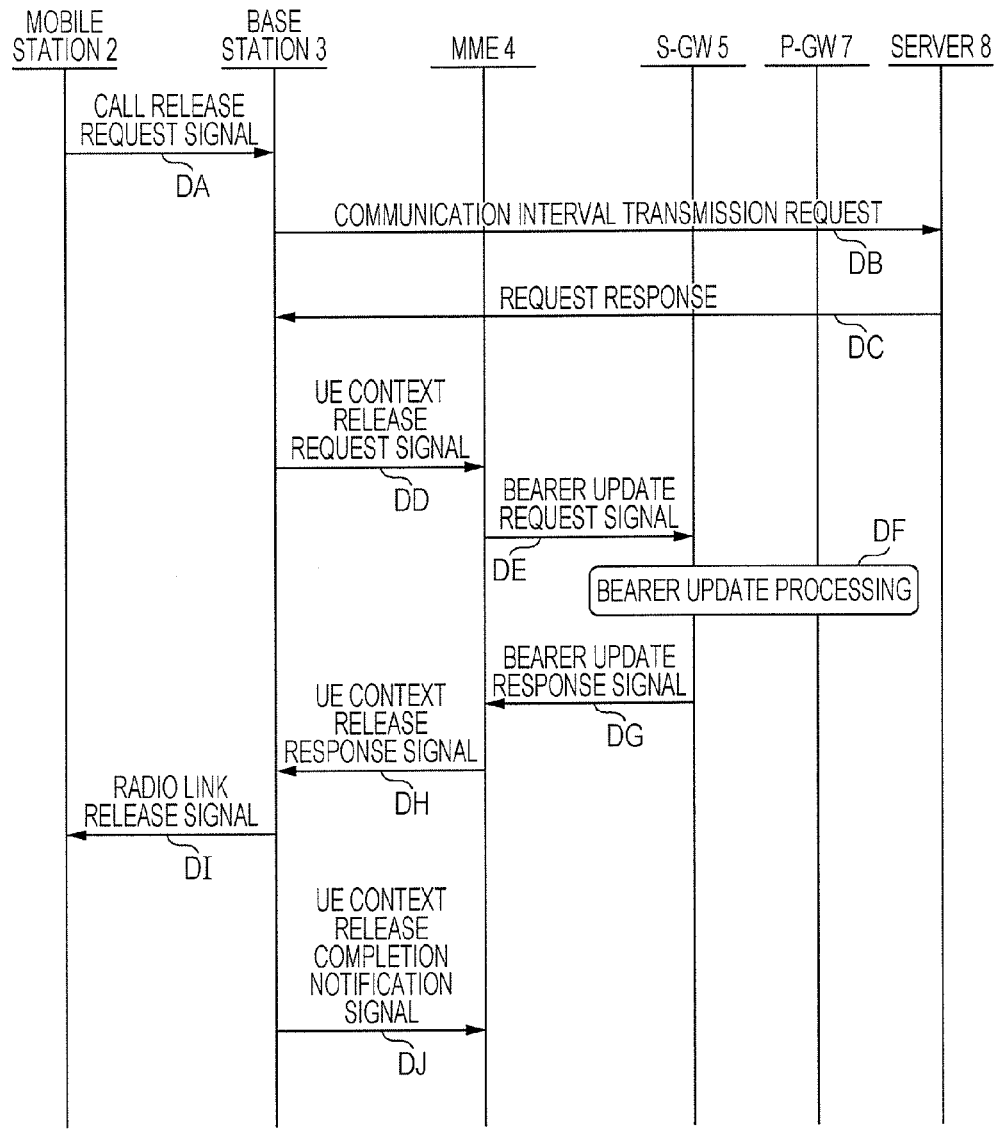
FIG. 14 is a diagram illustrating an example of an operational sequence performed by a communication system at the end of communication, according to an embodiment.

FIG. 14 is a diagram illustrating an example of an operational sequence performed by a communication system at the end of communication, according to an embodiment. The mobile station 2 that ends communication may transmit a call release request signal to the base station 3 in operation DA.

Upon receiving the call release request signal, the base station 3 may transmit a communication interval transmission request to the server 8 in operation DB. The server 8 may determine whether or not there is the history data 44 of the mobile station 2. In operation DC, the server 8 may transmit a request response to the base station 3. When there is the history data 44 of the mobile station 2, the server 8 may store information indicating the average communication interval stored in the storage unit 35 in the request response.

In the case of receiving information indicating an average communication interval, the base station 3 may determine the hold period of the core network resource for the mobile station 2 on the basis of the average communication interval. In operation DD, the base station 3 may transmit a UE context release request signal including information indicating the hold period to the MME 4. In operation DE, the MME 4 may transmit a bearer update request signal including information indicating the hold period to the S-GW 5. When the base station 3 does not receive information indicating an average communication interval in operation DC, the information indicating the hold period is not transmitted to the S-GW 5.

When the information indicating the hold period is transmitted to the S-GW 5, the S-GW 5 may perform processing of updating the bearer in the core network in operation DF. When the information indicating the hold period is not transmitted to the S-GW 5, the S-GW 5 may release the bearer in the core network. In operation DG, the S-GW 5 may transmit a bearer update response signal to the MME 4. After that, when the S-GW 5 does not receive a communication request for restarting communication from the mobile station 2 after the period corresponding to the hold period indicated by the received information elapses, the S-GW 5 may release the core network resource. Processing of releasing the core network resource performed by the S-GW 5 will be described below with reference to FIG. 18.

In operation DH, the MME 4 may transmit a UE context release response signal to the base station 3. Upon receiving the UE context release response signal, the base station 3 may transmit a radio link release signal to the mobile station 2 in operation DI. Also, the base station 3 may transmit information indicating the hold period to the mobile station 2. The base station 3 may store information indicating the hold period in the radio link release signal. The operations performed by the mobile station 2 after receiving the radio link release signal will be described below with reference to FIG. 19. In operation DJ, the base station 3 may transmit a UE context release completion notification signal to the MME 4.

Figure 15:
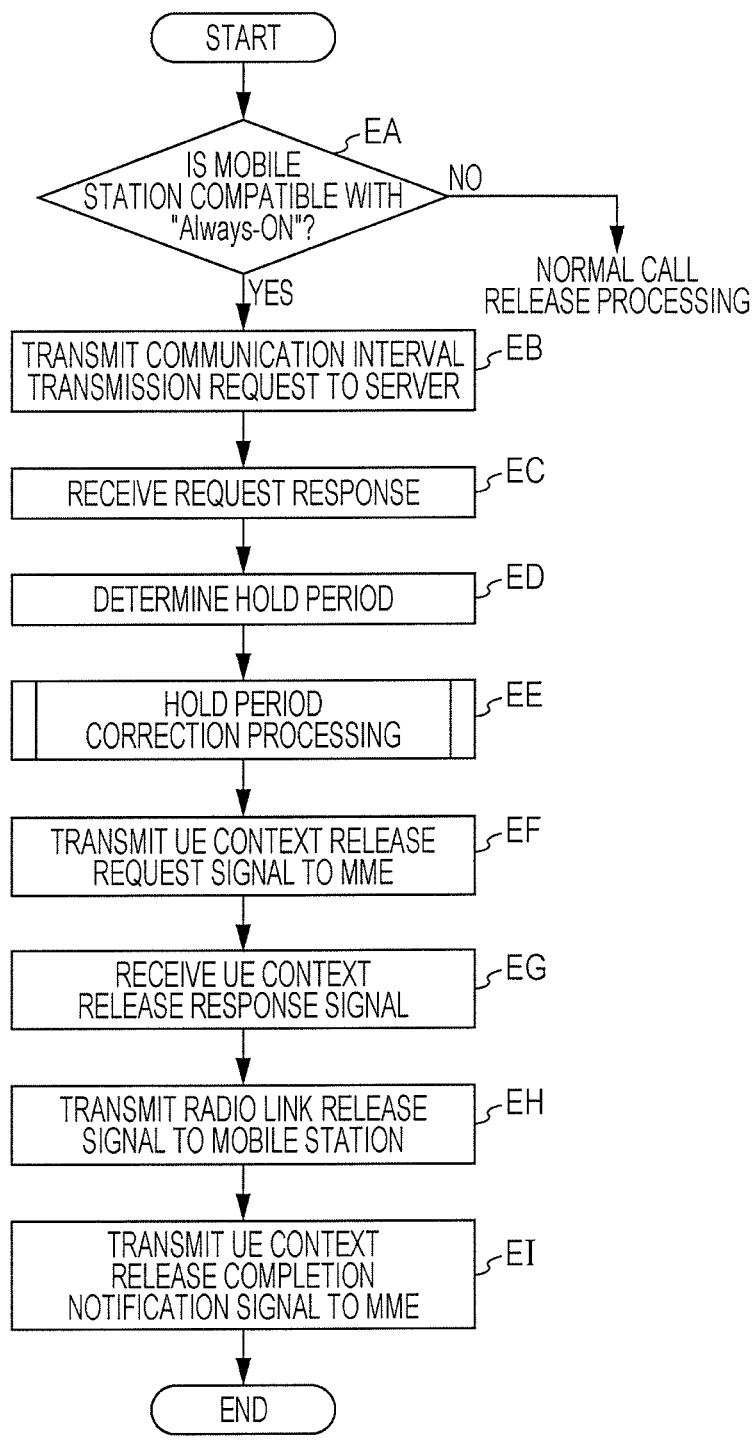
FIG. 15 is a diagram illustrating an example of an operational flowchart performed by a base station at the end of communication, according to an embodiment.

FIG. 15 is a diagram illustrating an example of an operational flowchart performed by a base station at the end of communication, according to an embodiment. When the base station 3 receives a call release request from the mobile station 2, in operation EA, the communication interval obtaining unit 21 may determine whether or not the mobile station 2 that has transmitted the call release request has a function of performing call control based on the "Always-ON" concept. The communication interval obtaining unit 21 may determine whether or not the mobile station 2 has a function of performing call control based on the "Always-ON" concept, in accordance with, for example, terminal ability information.

When the mobile station 2 has a function of performing call control based on the "Always-ON" concept (YES in operation EA), the operation may proceed to operation EB. When the mobile station 2 does not have a function of performing call control based on the "Always-ON" concept (NO in operation EA), normal call release processing is performed.

In operation EB, the communication interval obtaining unit 21 may transmit a communication interval transmission request to the server 8. In operation EC, the communication interval obtaining unit 21 may receive a request response including information indicating the average communication interval of the mobile station 2. In operation ED, the hold period determining unit 22 may determine the hold period of a core network resource in accordance with the average communication interval.

In operation EE, the hold period determining unit 22 may correct the hold period. In operation EF, the resource releasing unit 25 may transmit a UE context release request signal including information indicating the corrected hold period to the MME 4. In operation EG, the resource releasing unit 25 may receive a UE context release response signal from the MME 4.

In operation EH, the mobile station control unit 26 may transmit a radio link release signal to the mobile station 2. The radio link release signal may include information indicating the hold period. After that, the resource releasing unit 25 may perform processing of releasing a radio section resource. In operation EI, a UE context release completion notification signal may be transmitted to the MME 4. Accordingly, the operations performed by the base station 3 at the end of communication of the mobile station 2 may end.

Figure 16:
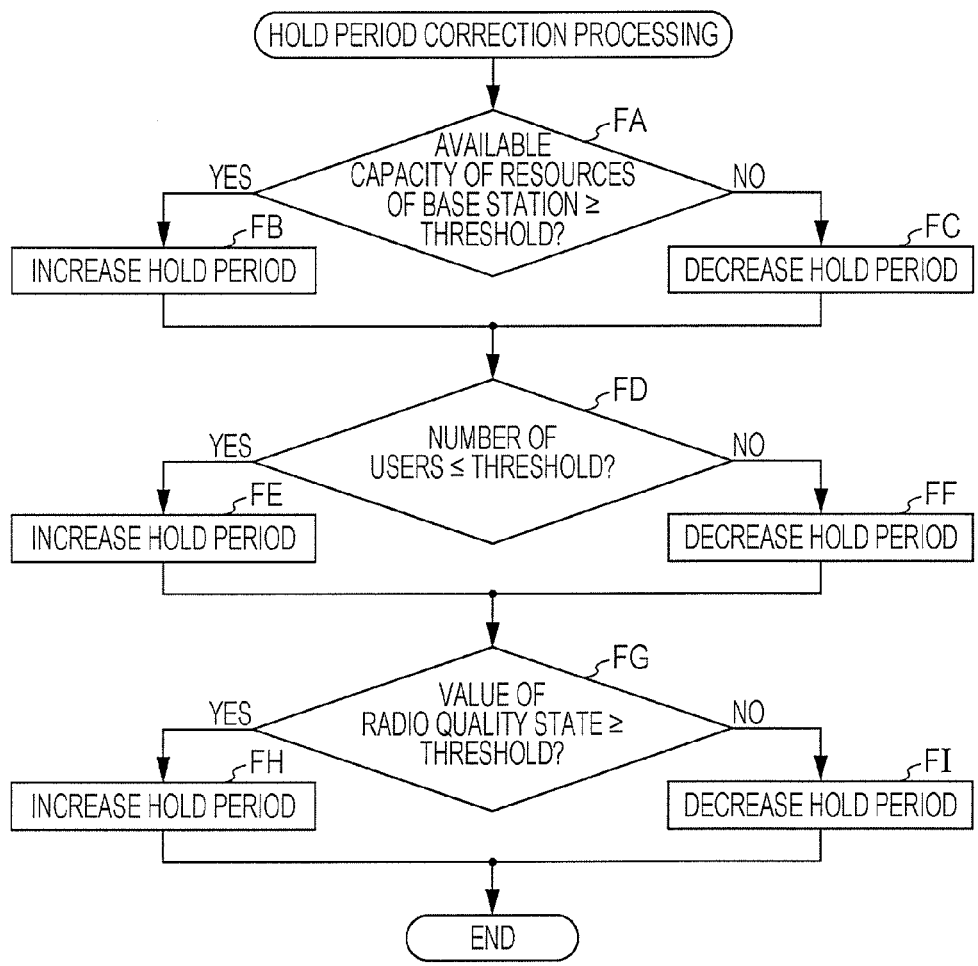
FIG. 16 is a diagram illustrating an example of an operational flowchart for hold period correction processing performed by a hold period determining unit, according to an embodiment.

FIG. 16 is a diagram illustrating an example of an operational flowchart for hold period correction processing performed by a hold period determining unit, according to an embodiment. In operation FA, the hold period determining unit 22 may determine whether or not the available capacity of the resources of the base station 3 is greater than or equal to a threshold. When the available capacity of the resources of the base station 3 is greater than or equal to the threshold (YES in operation FA), the processing may proceed to operation FB. When the available capacity of the resources of the base station 3 is less than the threshold (NO in operation FA), the processing may proceed to operation FC.

In operation FB, the hold period determining unit 22 may increase the hold period. Subsequently, the processing may proceed to operation FD. In operation FC, the hold period determining unit 22 may decrease the hold period. Subsequently, the processing may proceed to operation FD.

In operation FD, the hold period determining unit 22 may determine whether or not the number of users being located in the serving cell is less than or equal to a threshold. When the number of users being located in the serving cell is less than or equal to the threshold (YES in operation FD), the processing may proceed to operation FE. When the number of users being located in the serving cell is greater than the threshold (NO in operation FD), the processing may proceed to operation FF.

In operation FE, the hold period determining unit 22 may increase the hold period. Subsequently, the processing may proceed to operation FG. In operation FF, the hold period determining unit 22 may decrease the hold period. Subsequently, the processing may proceed to operation FG.

In operation FG, the hold period determining unit 22 may determine whether or not the value of a radio quality state is greater than or equal to a threshold. When the value of the radio quality state is greater than or equal to the threshold (YES in operation FG), the processing may proceed to operation FH. When the value of the radio quality state is less than the threshold (NO in operation FG), the processing may proceed to operation FI.

In operation FH, the hold period determining unit 22 may increase the hold period. Subsequently, the hold period correction processing ends. In operation FI, the hold period determining unit 22 decreases the hold period. Subsequently, the hold period correction processing may end.

Figure 17:
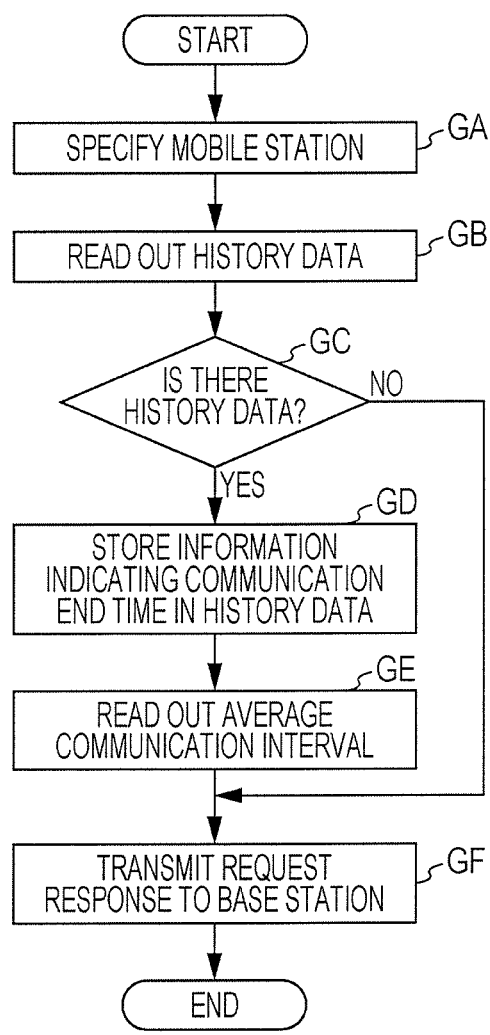
FIG. 17 is a diagram illustrating an example of an operational flowchart performed by a server at the end of communication, according to an embodiment.

FIG. 17 is a diagram illustrating an example of an operational flowchart performed by a server at the end of communication, according to an embodiment. When the server 8 receives a communication interval transmission request from the base station 3, in operation GA, the history data management unit 41 may specify the mobile station 2 that has ended communication on the basis of the identifier of the mobile station 2 included in the communication interval transmission request. In operation GB, the history data management unit 41 may attempt to read out the history data 44 created for the mobile station 2.

In operation GC, the history data management unit 41 may determine whether or not there is the history data 44 created for the mobile station 2. When there is the history data 44 (YES in operation GC), the operation may proceed to operation GD. When there is not the history data 44 (NO in operation GC), the operation may proceed to operation GF.

In operation GD, the history data management unit 41 may store information indicating the communication end time of the mobile station 2 in the history data 44. In operation GE, the communication interval transmitting unit 43 may read out the information indicating the average communication interval of the mobile station 2 stored in the storage unit 35. In operation GF, the communication interval transmitting unit 43 may transmit a response request to the base station 3. When information indicating the average communication interval of the mobile station 2 is stored in the storage unit 35, the response request may include the information indicating the average communication interval. Accordingly, the operations performed by the server 8 at the end of communication end.

Figure 18:
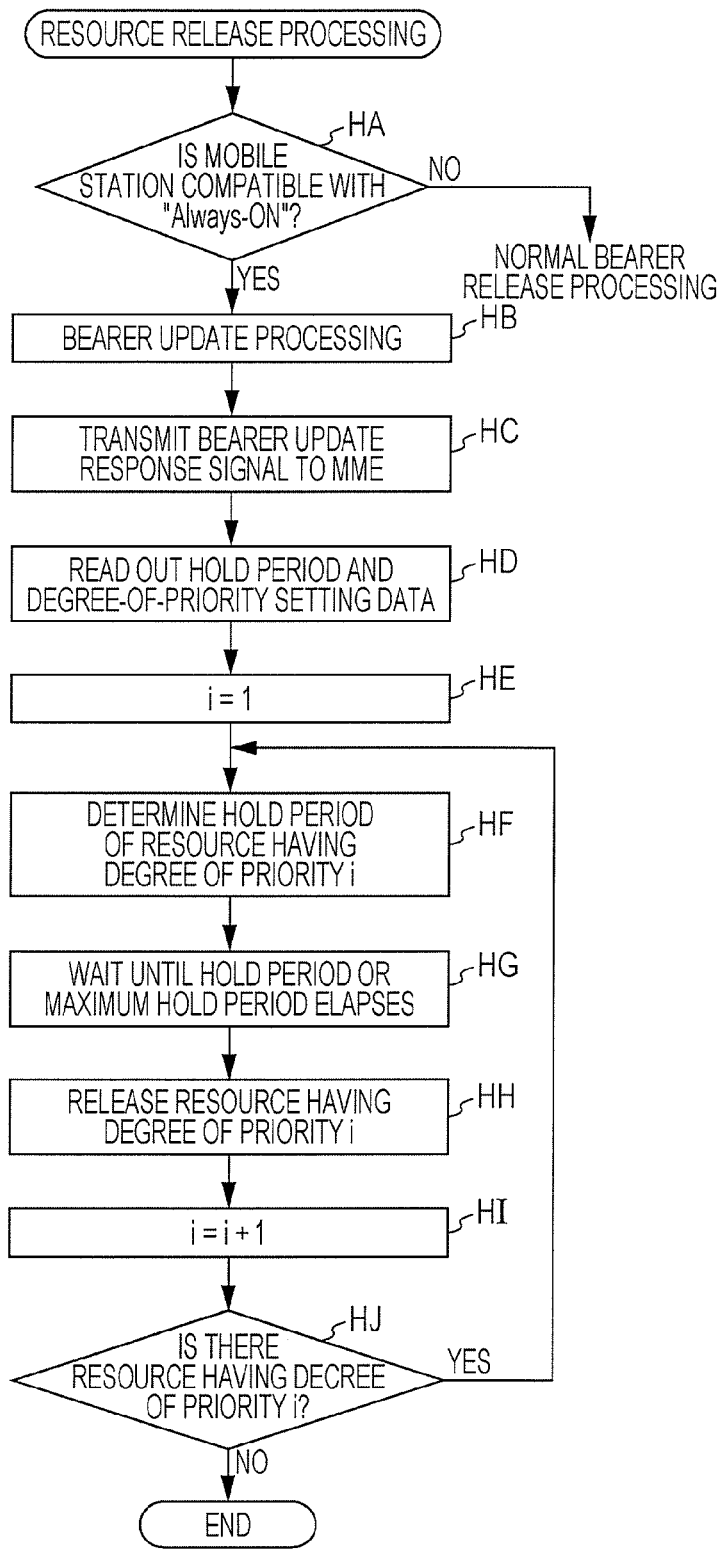
FIG. 18 is a diagram illustrating an example of an operational flowchart for resource release processing performed by an S-GW at the end of communication, according to an embodiment.

FIG. 18 is a diagram illustrating an example of an operational flowchart for resource release processing performed by an S-GW at the end of communication, according to an embodiment. When the S-GW 5 receives a bearer update request signal including information indicating a hold period, in operation HA, the resource releasing unit 62 may determine whether or not the mobile station 2 has a function of performing call control based on the "Always- ON" concept. The resource releasing unit 62 may determine whether or not the mobile station 2 has a function of performing call control based on the "Always-ON" concept, in accordance with, for example, terminal ability information.

When the mobile station 2 has a function of performing call control based on the "Always-ON" concept (YES in operation HA), the processing may proceed to operation HB. When the mobile station 2 does not have a function of performing call control based on the "Always-ON" concept (NO in operation HA), normal bearer release processing may be performed.

In operation HA, the resource releasing unit 62 may determine whether or not the S-GW 5 has a function of performing call control based on the "Always-ON" concept. When the S-GW 5 has a function of performing call control based on the "Always-ON" concept, operation HB and the subsequent operations may be performed. Otherwise, normal bearer release processing may be performed. Also, the resource releasing unit 62 may determine whether or not the hold period indicated by the received information is zero. When the hold period is not zero, operation HB and the subsequent operations may be performed. When the hold period is zero, normal bearer release processing may be performed.

In operation HB, the bearer setting unit 61 may perform bearer update processing in accordance with information received through the bearer update request signal. In operation HC, the bearer setting unit 61 may transmit a bearer update response signal to the MME 4.

In operation HD, the resource releasing unit 62 may read out a hold period from the bearer update request signal, and may read out the degree-of-priority setting data 63 from the storage unit 55. In operation HE, the resource releasing unit 62 may set a value "1" to a variable "i" that identifies a core network resource.

In operation HF, the resource releasing unit 62 may determine the hold period of the core network resource having the degree of priority "i" specified by the degree-of-priority setting data 63, in accordance with the hold period read out from the bearer update request signal and the information element "hold period" of the degree-of-priority setting data 63. In operation HG, the resource releasing unit 62 may wait until the shorter period among the hold period determined in operation HF and the value of the information element "maximum hold period" of the degree-of-priority setting data 63 elapses.

When a communication request is not generated by the mobile station 2 during this period, in operation HH, the resource releasing unit 62 may release the core network resource having the degree of priority "i". In operation HI, the resource releasing unit 62 may increment the value of the variable i by one. In operation HJ, the resource releasing unit 62 may determine whether or not the core network resource having the degree of priority "i" is specified by the degree-of-priority setting data 63.

When the core network resource having the degree of priority "i" is specified (YES in operation HJ), the processing may return to operation HF. When the core network resource having the degree of priority "i" is not specified (NO in operation HJ), the resource release processing performed by the S-GW 5 may end.

Figure 19:
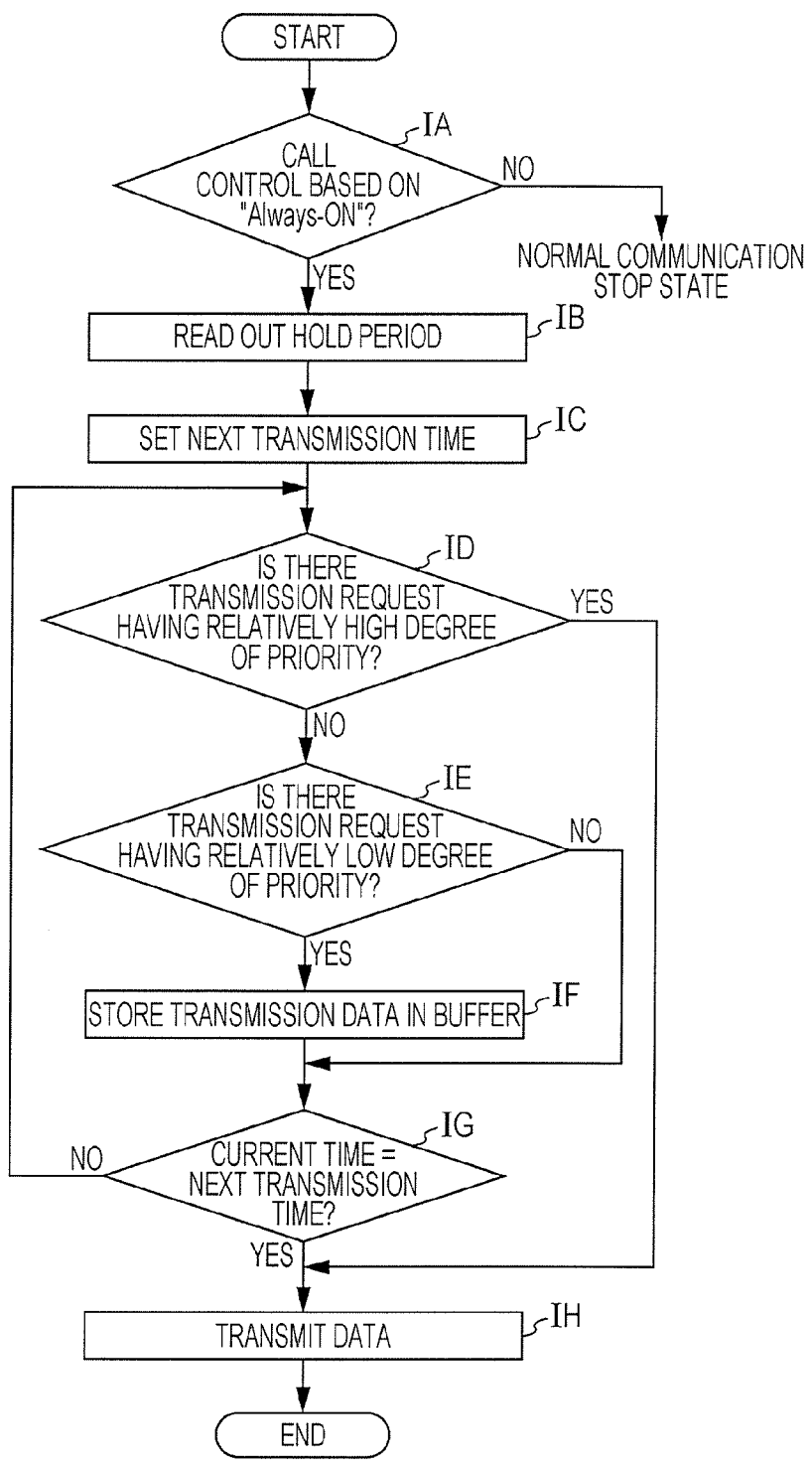
FIG. 19 is a diagram illustrating an example of an operational flowchart performed by a mobile station after the end of communication, according to an embodiment.

FIG. 19 is a diagram illustrating an example of an operational flowchart performed by a mobile station after the end of communication, according to an embodiment. When the mobile station 2 receives a radio link release signal from the base station 3, in operation IA, the transmission time determining unit 81 may determine whether or not the call control that has released a radio link is call control based on the "Always-ON" concept. For example, the transmission time determining unit 81 may determine whether or not the call control is call control based on the "Always-ON" concept in accordance with whether or not a notification about a hold period has been received from the base station 3.

When the call control is call control based on the "Always-ON" concept (YES in operation IA), the operation proceeds to operation IB. When the call control is not call control based on the "Always-ON" concept (NO in operation IA), the mobile station 2 may shift to a normal communication stop state. In the normal communication stop state, the mobile station 2 may start data transmission at the time when a transmission request is generated.

In operation IB, the transmission time determining unit 81 may read out a hold period from the radio link release signal. In operation IC, the transmission time determining unit 81 may set the next transmission time.

In operation ID, the transmission suspending unit 82 may determine whether or not there is a transmission request having a relatively high degree of priority. When there is a transmission request having a relatively high degree of priority (YES in operation ID), the operation may proceed to operation IH. When there is not a transmission request having a relatively high degree of priority (NO in operation ID), the operation may proceed to operation IE.

In operation IE, the transmission suspending unit 82 may determine whether or not there is a transmission request having a relatively low degree of priority. When there is a transmission request having a relatively low degree of priority (YES in operation IE), the operation may proceed to operation IF. When there is not a transmission request having a relatively low degree of priority (NO in operation IE), the operation may proceed to operation IG. In operation IF, the transmission suspending unit 82 may store generated transmission data in a buffer without transmitting it. Subsequently, the operation may proceed to operation IG.

In operation IG, the transmission suspending unit 82 may determine whether or not the current time is the same as the next transmission time. When the current time is the same as the next transmission time (YES in operation IG), the processing may proceed to operation IH. When the current time is before the next transmission time (NO in operation IG), the operation may return to operation ID.

In operation IH, the transmission suspending unit 82 may transmit the data stored in the buffer and having a relatively low degree of priority of a transmission request. Also, the transmission suspending unit 82 may transmit the data having a relatively high degree of priority of a transmission request.

5. Advantages of Embodiment

According to the embodiment, a period for which a core network resource is held may be determined in accordance with the communication interval, that is, the communication frequency, of the mobile station 2. Thus, for example, by decreasing the hold period of the core network resource of the mobile station 2 whose communication frequency is low, the usage efficiency of core network resources may be increased.

Further, connection delay may be reduced by sequentially releasing core network resources in accordance with the priority based on the available capacity and the acquisition time of each core network resource. For example, a resource which has a large available capacity may be released with a higher priority than a resource which has a small available capacity and is difficult to re-obtain, and thereby processing delay caused by obtaining a resource which has a small available capacity may be reduced. Also, for example, a resource whose acquisition time is short may be released with a higher priority than a resource whose acquisition time is long, and thereby processing delay caused by obtaining a resource whose acquisition time is long may be reduced.

Further, a communication request from the mobile station 2 may be suspended during a period after the end of communication, and thus the load in a wireless access network may be reduced. On the other hand, when a communication request is transmitted just before the hold period of a core network resource elapses, connection delay that occurs at reconnection may be reduced. Also, an increase in the load on the core network caused by repetition of release and acquisition of core network resources may be reduced.

6. Hardware Configuration

Figure 20:
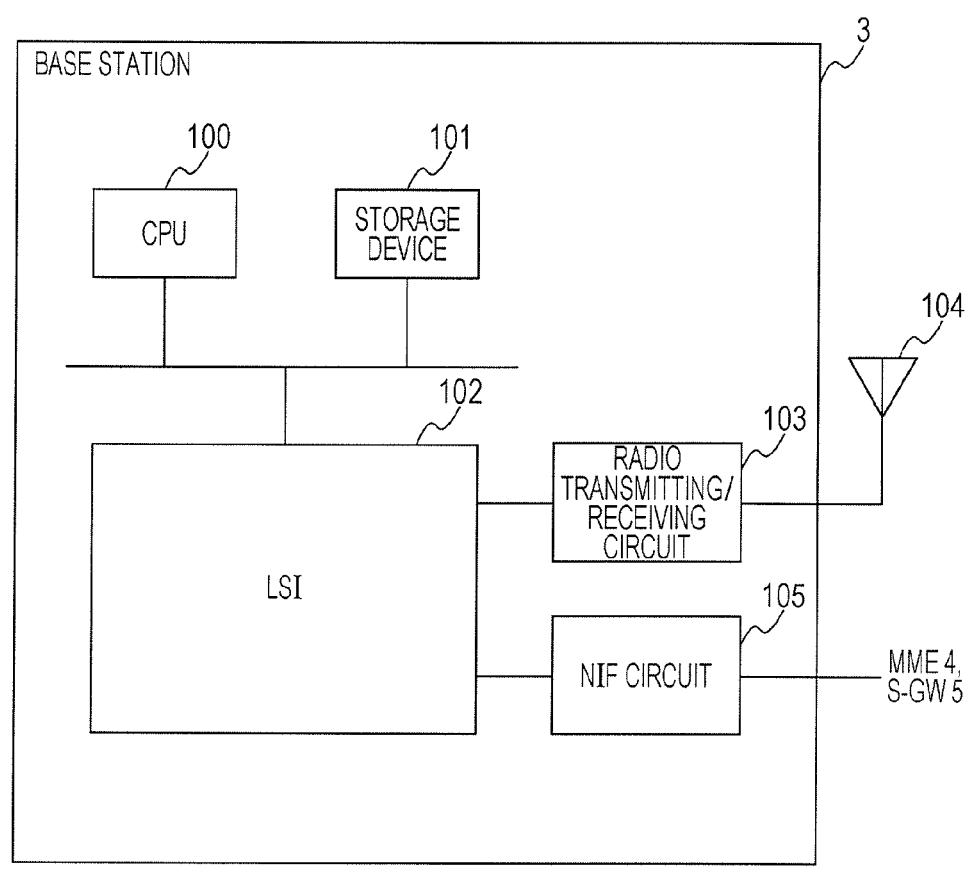
FIG. 20 is a diagram illustrating an example of a hardware configuration of a base station, according to an embodiment.

FIG. 20 is a diagram illustrating an example of a hardware configuration of a base station, according to an embodiment. The base station 3 may include a central processing unit (CPU) 100, a storage device 101, a large scale integration (LSI) 102, and a radio transmitting/receiving circuit 103. The base station 3 may include an antenna 104 and a network interface (NIF) circuit 105. The storage device 101 may include a nonvolatile memory, a read only memory (ROM), a random access memory (RAM), a hard disk, and the like for storing computer programs executed by the CPU 100 and data. The radio transmitting/receiving circuit 103 may include a digital-to-analog conversion circuit, an analog-to-digital conversion circuit, an amplifier circuit, a frequency conversion circuit, and the like for processing radio-frequency signals and baseband signals.

The above-described operations of the radio transmitting/receiving unit 10 of the base station 3 illustrated in FIG. 5 may be implemented by the radio transmitting/receiving circuit 103. The above-described operations of the radio transmission/reception IF unit 11, the baseband signal processing unit 12, and the channel signal switching unit 13 may be executed by the LSI 102. The above-described operations of the channel IF unit 14 may be executed by the NIF circuit 105. The above-described operations of the control unit 15 may be executed by the CPU 100.

Figure 21A:
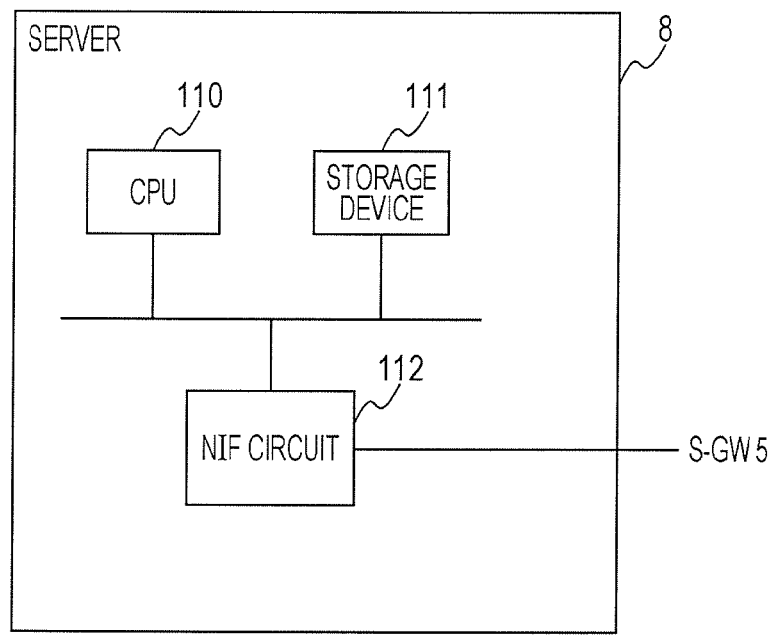
FIG. 21A is a diagram illustrating an example of a hardware configuration of a server, according to an embodiment.

FIG. 21A is a diagram illustrating an example of a hardware configuration of a server, according to an embodiment. The server 8 may include a CPU 110, a storage device 111, and an NIF circuit 112. The storage device 111 may include a nonvolatile memory, a ROM, a RAM, a hard disk, and the like for storing computer programs executed by the CPU 110 and data.

The above-described operations of the message receiving unit 30, the message interpreting unit 31, the message editing unit 32, and the message transmitting unit 33 illustrated in FIG. 6 may be executed by the NIF circuit 112. The above-described operations of the control unit 34 may be executed by the CPU 110. The storage region of the storage unit 35 may be provided in the storage device 111.

Figure 21B:
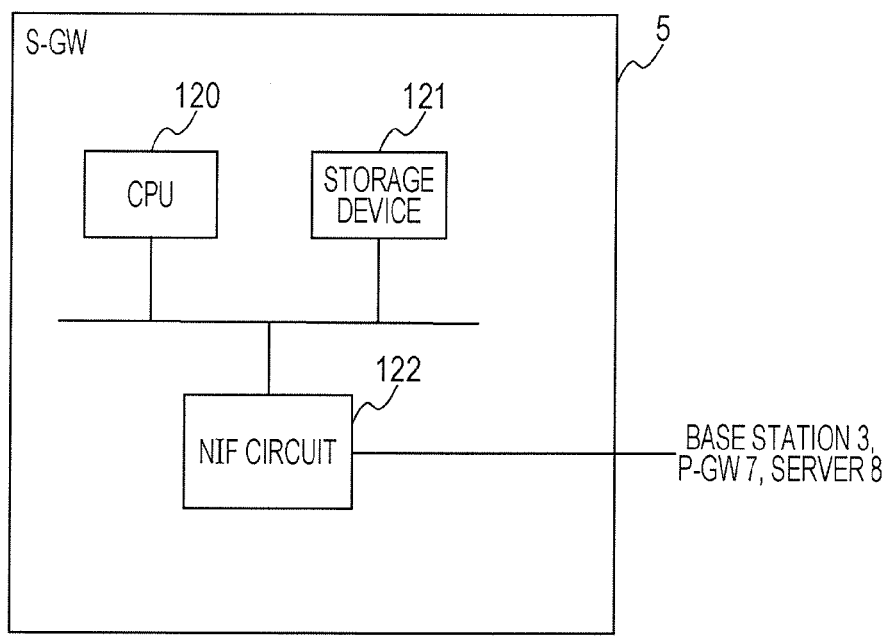
FIG. 21B is a diagram illustrating an example of a hardware configuration of an S-GW, according to an embodiment.

FIG. 21B is a diagram illustrating an example of a hardware configuration of an S-GW, according to an embodiment. The S-GW 5 may include a CPU 120, a storage device 121, and an NIF circuit 122. The storage device 121 may include a nonvolatile memory, a ROM, a RAM, a hard disk, and the like for storing computer programs executed by the CPU 120 and data.

The above-described operations of the message receiving unit 50, the message interpreting unit 51, the message editing unit 52, and the message transmitting unit 53 illustrated in FIG. 8 may be executed by the NIF circuit 122. The above-described operations of the control unit 54 may be executed by the CPU 120. The storage region of the storage unit 55 may be provided in the storage device 121.

Figure 22:
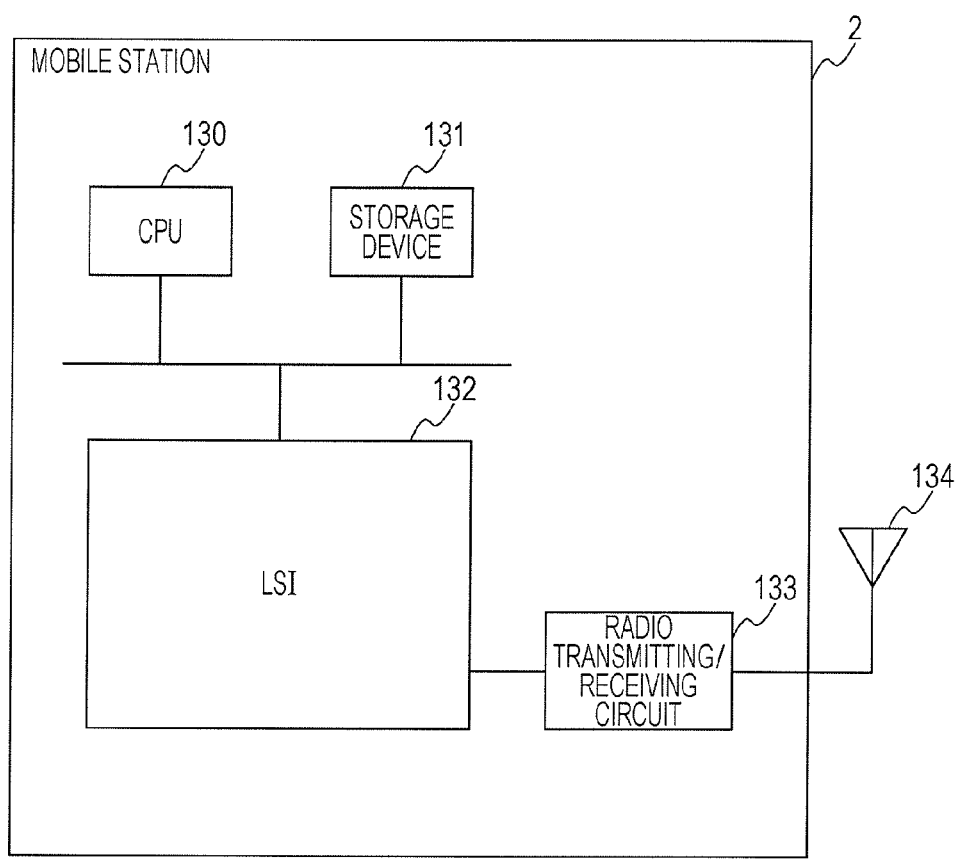
FIG. 22 is a diagram illustrating an example of a hardware configuration of a mobile station, according to an embodiment.

FIG. 22 is a diagram illustrating an example of a hardware configuration of a mobile station, according to an embodiment. The mobile station 2 may include a CPU 130, a storage device 131, an LSI 132, a radio transmitting/receiving circuit 133, and an antenna 134. The storage device 131 may include a nonvolatile memory, a ROM, a RAM, and the like for storing computer programs executed by the CPU 130 and data. The radio transmitting/receiving circuit 133 may include a digital-to-analog conversion circuit, an analog-to-digital conversion circuit, an amplifier circuit, a frequency conversion circuit, and the like for processing radio-frequency signals and baseband signals.

The above-described operations of the radio transmitting/receiving unit 70 illustrated in FIG. 10 may be executed by the radio transmitting/receiving circuit 133. The above-described operations of the baseband signal processing unit 71 may be executed by the LSI 132. The above-described operations of the control unit 72 may be executed by the CPU 130.

The hardware configurations illustrated in FIGS. 20, 21A, 21B, and 22 are merely examples for describing the embodiment. As long as the above-described operations are executed, the base station apparatus, the server apparatus, the gateway apparatus, and the mobile station apparatus described in this specification may have any other hardware configurations.

The functional configuration diagrams in FIGS. 5, 6, 8, and 10 mainly illustrate the configurations related to the functions described in this specification. The base station 3, the server 8, the S-GW 5, and the mobile station 2 may include elements other than the elements illustrated in the drawings. Further, the series of operations illustrated in FIGS. 11 to 19 may be regarded as a method including a plurality of procedures.

All examples and conditional language recited herein are intended for pedagogical purposes to aid the reader in understanding as parts of the invention and the concepts contributed by the inventor(s) to furthering the art, and are to be construed as being without limitation to such specifically recited examples and conditions, nor does the organization of such examples in the specification relate to a showing of the superiority and/or inferiority of various aspects of the invention. Although example embodiment of the present invention has been described in detail, it should be understood that the various changes, substitutions, and alterations could be made hereto without departing from the spirit and scope hereof.

What is claimed is:

1. A base station apparatus having a serving cell coupled to a network, the base station apparatus comprising:
 a processor coupled to a memory and configured to:
  determine a hold period for which a core network resource of the core network is to be held for a mobile station apparatus coupled to the base station apparatus, in accordance with a communication frequency of the mobile station apparatus, the core network being configured to couple a radio access network and a public network, the communication frequency of the mobile station apparatus comprising an average communication interval of the mobile station apparatus, the core network resource being used for setting a bearer in the core network for the mobile station apparatus;

modify the hold period based on at least one of: an available capacity of resources of the base station apparatus, a number of users coupled to the base station apparatus in the serving cell and a radio signal quality of the mobile station apparatus; and cause a gateway apparatus in the core network to release the core network resource after the hold period, by transmitting information indicating the hold period to the gateway apparatus.

2. The base station apparatus of claim 1, wherein the processor is further configured to cause the mobile station apparatus to suspend communication until a waiting period that is determined based on the hold period elapses, by transmitting the information indicating the modified hold period to the mobile station apparatus.

3. The base station apparatus of claim 1, wherein the processor is further configured to:
notify a server apparatus accessible by the base station apparatus that the mobile station apparatus has started communication; and
cause the server apparatus to transmit information indicating the communication frequency of the mobile station apparatus, by notifying the server apparatus that the mobile station apparatus has ended communication.

4. The base station apparatus according to claim 1, wherein the processor is further configured to calculate the communication frequency based on history data including a communication start time and a communication end time of the mobile station apparatus.

5. A gateway apparatus coupled to a core network that couples a radio access network and a public network, the gateway apparatus comprising:
a processor coupled to a memory and configured to:
receive, from a base station apparatus, information including a hold period for which a core network resource is to be held for a mobile station apparatus coupled to the base station apparatus, the core network resource being used for setting a bearer in the core network for the mobile station apparatus, the hold period being determined based on a communication frequency of the mobile station apparatus comprising an average communication interval of the mobile station apparatus, and being modified based on at least one of: an available capacity of resources of the base station apparatus, a number of users coupled to the base station apparatus in a serving cell, and a radio signal quality of the mobile station apparatus; and
release the core network resource after a period of time corresponding to the hold period included in the received information has elapsed.

6. The gateway apparatus of claim 5, wherein the processor is configured to sequentially release a plurality of core network resources in accordance with an order that is predetermined among the plurality of core network resources.

7. A communication system comprising:
a base station apparatus including a first processor;
a radio access network coupled to the base station apparatus;
a core network that couples the radio access network and a public network; and
a gateway apparatus including a second processor coupled to the core network, wherein:
the first processor of the base station apparatus is configured to:
determine a hold period for which a core network resource is to be held for a mobile station apparatus coupled to the base station apparatus, in accordance with a communication frequency of the mobile station apparatus, the core network resource being used for setting a bearer in the core network for the mobile station apparatus, and the communication frequency of the mobile station apparatus comprising an average communication interval of the mobile station apparatus,
modify the hold period based on at least one of: an available capacity of resources of the base station apparatus, a number of users coupled to the base station apparatus in a serving cell and a radio signal quality of the mobile station apparatus, and
transmit information including the modified hold period to the gateway apparatus; and
the second processor of the gateway apparatus is configured to:
receive the information including the modified hold period transmitted from the base station apparatus, and
release the core network resource after a period of time corresponding to the determined hold period included in the received information has elapsed.

8. A method comprising:
determining a hold period for which a core network resource is to be held for a mobile station apparatus, in accordance with a communication frequency of the mobile station apparatus, the core network being configured to couple a radio access network and a public network, the core network resource being used for setting a bearer in the core network for the mobile station apparatus, and the communication frequency of the mobile station apparatus being comprising an average communication interval of the mobile station apparatus;
modifying the hold period based on at least one of: an available capacity of resources of the base station apparatus, a number of users coupled to the base station apparatus in a serving cell, and a radio signal quality of the mobile station apparatus; and
releasing the core network resource after a period of time corresponding to the modified hold period has elapsed.

9. The base station apparatus of claim 1, wherein the processor is further configured to receive information on the communication frequency of the mobile station apparatus from a server apparatus on a network after the mobile station apparatus ends a communication.

10. The base station apparatus of claim 1, wherein processor is further configured to determine the hold period based on the communication frequency which is determined based at least in part on history data comprising one or more communication start times and one or more communication end times of the mobile station apparatus.

11. The gateway apparatus of claim 6, wherein the processor is further configured to release the plurality of core network resources in accordance with a priority based on an available capacity and an acquisition time of each core network resource.

12. The base station apparatus of claim 1, wherein the processor is further configured to modify the hold period based on the available capacity of resources of the base station apparatus.

13. The base station apparatus of claim 12, wherein the processor is further configured to increase the hold period when the available capacity of resources of the base station apparatus is determined to be greater than or equal to a first threshold, and to decrease the hold period when the available capacity of resources of the base station apparatus is determined to be less than the first threshold.

14. The base station apparatus of claim 1, wherein the processor is further configured to modify the hold period based on the number of users coupled to the base station apparatus in the serving cell.

15. The base station apparatus of claim 14, wherein the processor is further configured to decrease the hold period when the number of users coupled to the base station apparatus in the serving cell of the base station apparatus is determined to be greater than a second threshold, and to increase the hold period when the number of users coupled to the base station apparatus in the serving cell of the base station apparatus is determined to be less than the second threshold.

16. The base station apparatus of claim 1, wherein the processor is further configured to modify the hold period based on the radio signal quality of the mobile station apparatus.

17. The base station apparatus of claim 16, wherein the processor is further configured to decrease the hold period when the radio signal quality is determined to be less than a third threshold and to increase the hold period when the radio signal quality is determined to be greater than the third threshold.

* * * * *